(12) United States Patent
Ozawa

(10) Patent No.: US 8,331,583 B2
(45) Date of Patent: Dec. 11, 2012

(54) NOISE REDUCING APPARATUS AND NOISE REDUCING METHOD

(75) Inventor: Kazuhiko Ozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 374 days.

(21) Appl. No.: 12/707,906

(22) Filed: Feb. 18, 2010

(65) Prior Publication Data

US 2010/0260354 A1 Oct. 14, 2010

(30) Foreign Application Priority Data

Apr. 13, 2009 (JP) ................. 2009-097190

(51) Int. Cl.
*H04B 15/00* (2006.01)
*G10L 21/00* (2006.01)

(52) U.S. Cl. ............ 381/94.4; 381/71.11; 381/71.9; 381/94.2; 381/94.3; 381/71.2; 704/207; 704/228; 704/233; 704/236; 708/290; 708/313

(58) Field of Classification Search ........... 381/71.11, 381/71.9, 94.4, 71.2, 94.2, 94.3; 700/94; 704/233, 236, 226, 245, 227, 240; 708/290, 708/313

See application file for complete search history.

(56) References Cited

U.S. PATENT DOCUMENTS

| | | | | |
|---|---|---|---|---|
| 5,228,088 | A * | 7/1993 | Kane et al. | 704/233 |
| 5,812,970 | A * | 9/1998 | Chan et al. | 704/226 |
| 6,523,003 | B1 * | 2/2003 | Chandran et al. | 704/225 |
| 2005/0234715 | A1 * | 10/2005 | Ozawa | 704/226 |
| 2007/0150261 | A1 * | 6/2007 | Ozawa | 704/200.1 |
| 2008/0056511 | A1 * | 3/2008 | Zhang et al. | 381/94.4 |

FOREIGN PATENT DOCUMENTS

| | | | |
|---|---|---|---|
| JP | 02235266 A | * | 9/1990 |
| JP | 07072897 A | * | 3/1995 |
| JP | 2005266161 A | * | 9/2005 |
| JP | 2008-52772 | | 3/2008 |
| JP | 2008-71374 | | 3/2008 |
| JP | 2008-77707 | | 4/2008 |

OTHER PUBLICATIONS

Vaseghi et al, Detection and Suppression of impulse Noise in Speech Communication System, IEEE, 1990.*
Walter Etter, Restoration of a Discrete-Time Signal Segment by Interpolation Based on the left-Sided and Right-Sided Autoregressive Parameters, IEEE, 1996.*
Godsill et al, Digital Audio Restoration, 1997, p. 10-17.*

* cited by examiner

*Primary Examiner* — Walter F Briney, III
*Assistant Examiner* — Kuassi Ganmavo
(74) *Attorney, Agent, or Firm* — Oblon, Spivak, McClelland, Maier & Neustadt, L.L.P.

(57) ABSTRACT

A noise reducing apparatus includes: a voice signal inputting unit inputting an input voice signal; a noise occurrence period detecting unit detecting a noise occurrence period; a noise removing unit removing a noise for the noise occurrence period; a generation source signal acquiring unit acquiring a generation source signal with a time duration corresponding to a time duration corresponding to the noise occurrence period; a pitch calculating unit calculating a pitch of an input voice signal interval; an interval signal setting unit setting interval signals divided in each unit period interval; an interpolation signal generating unit generating an interpolation signal with the time duration corresponding to the noise occurrence period and alternately arranging the interval signal in a forward time direction and the interval signal in a backward time direction; and a combining unit combining the interpolation signal and the input voice signal, from which the noise is removed.

16 Claims, 25 Drawing Sheets

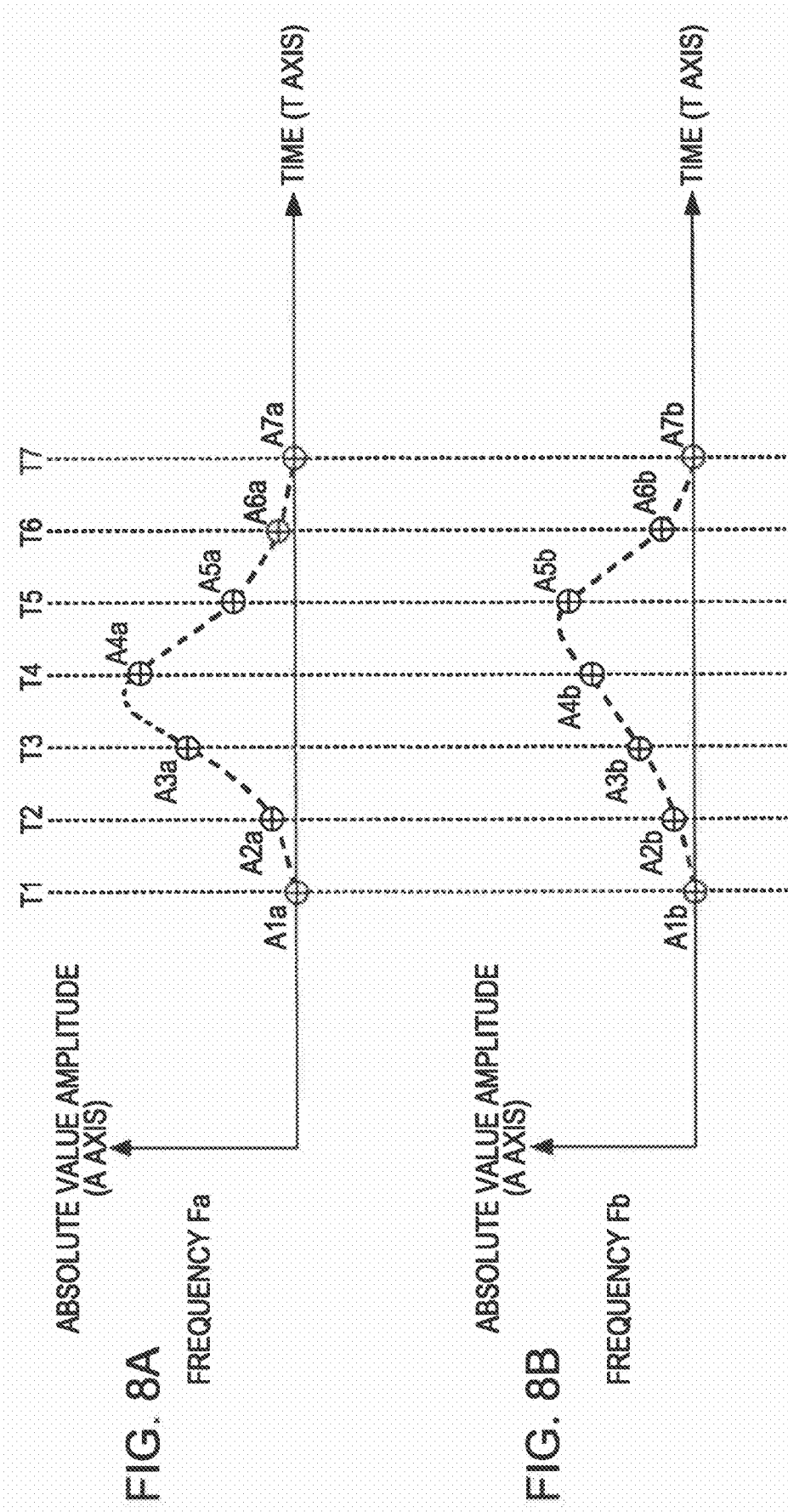

TIME DIRECTION NORMALIZATION

AMPLITUDE DIRECTION NORMALIZATION

↓ TIME DIRECTION NORMALIZATION

↓ AMPLITUDE DIRECTION NORMALIZATION

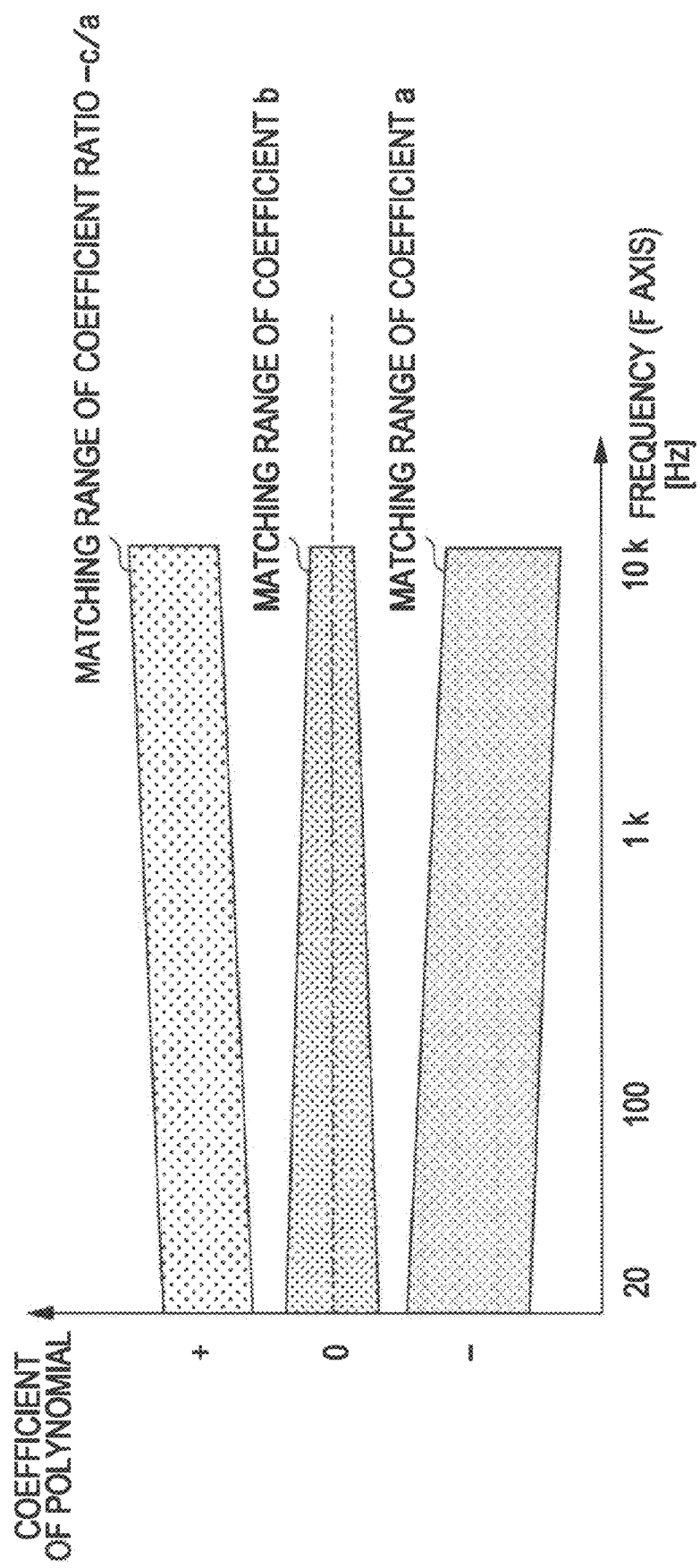

FIG. 12

| DATA POSITION AFTER FFT | REAL FREQUENCY [Hz] | | COEFFICIENT a | COEFFICIENT b | COEFFICIENT RATIO −c/a | COEFFICIENT c |
|---|---|---|---|---|---|---|
| 1 TO 8 | 43.1 TO 344.5 | UPPER LIMIT | −21 | 34 | 1.68 | 73 |
| | | LOWER LIMIT | −62 | −48 | 1.30 | 50 |
| 9 TO 40 | 387.6 TO 1.72 k | UPPER LIMIT | −32 | 24 | 1.75 | 124 |
| | | LOWER LIMIT | −92 | −21 | 1.31 | 54 |
| 41 TO 53 | 1.77 k TO 2.28 k | UPPER LIMIT | −40 | 13 | 3.05 | 410 |
| | | LOWER LIMIT | −302 | −15 | 1.34 | 64 |
| 54 TO 512 | 2.33 k TO 22.1 k | UPPER LIMIT | — | — | — | — |
| | | LOWER LIMIT | — | — | — | — |

INPUT VOICE SIGNAL

SOURCE INTERPOLATION SIGNAL

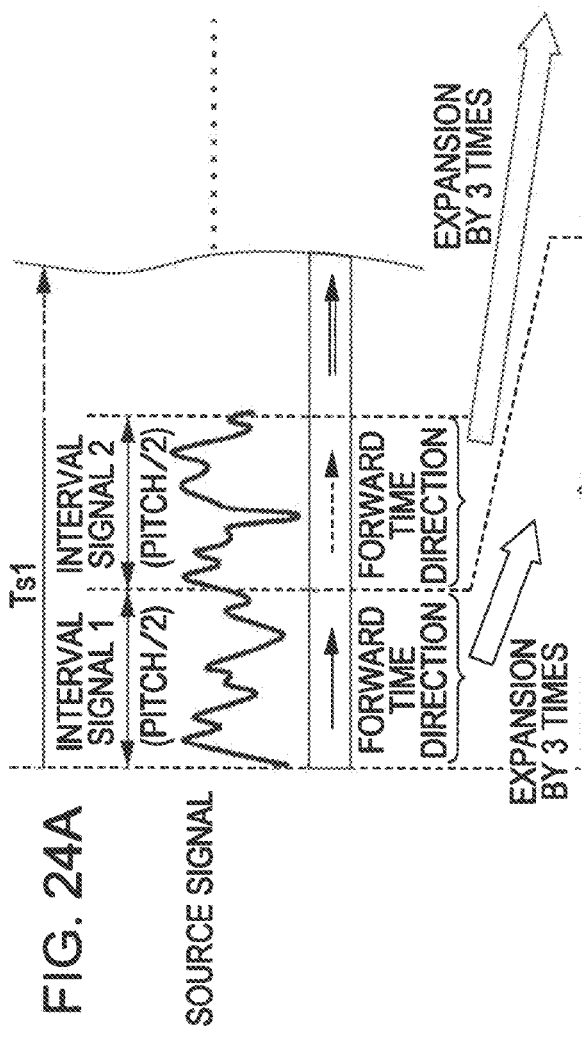
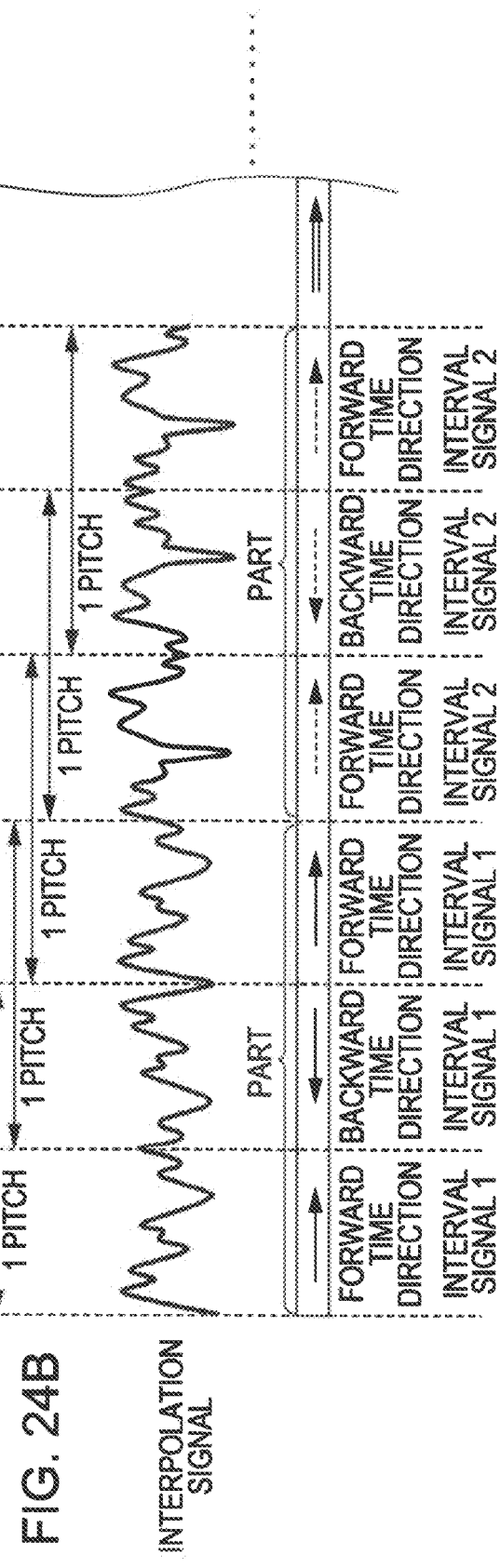
FIG. 24A SOURCE SIGNAL
FIG. 24B INTERPOLATION SIGNAL

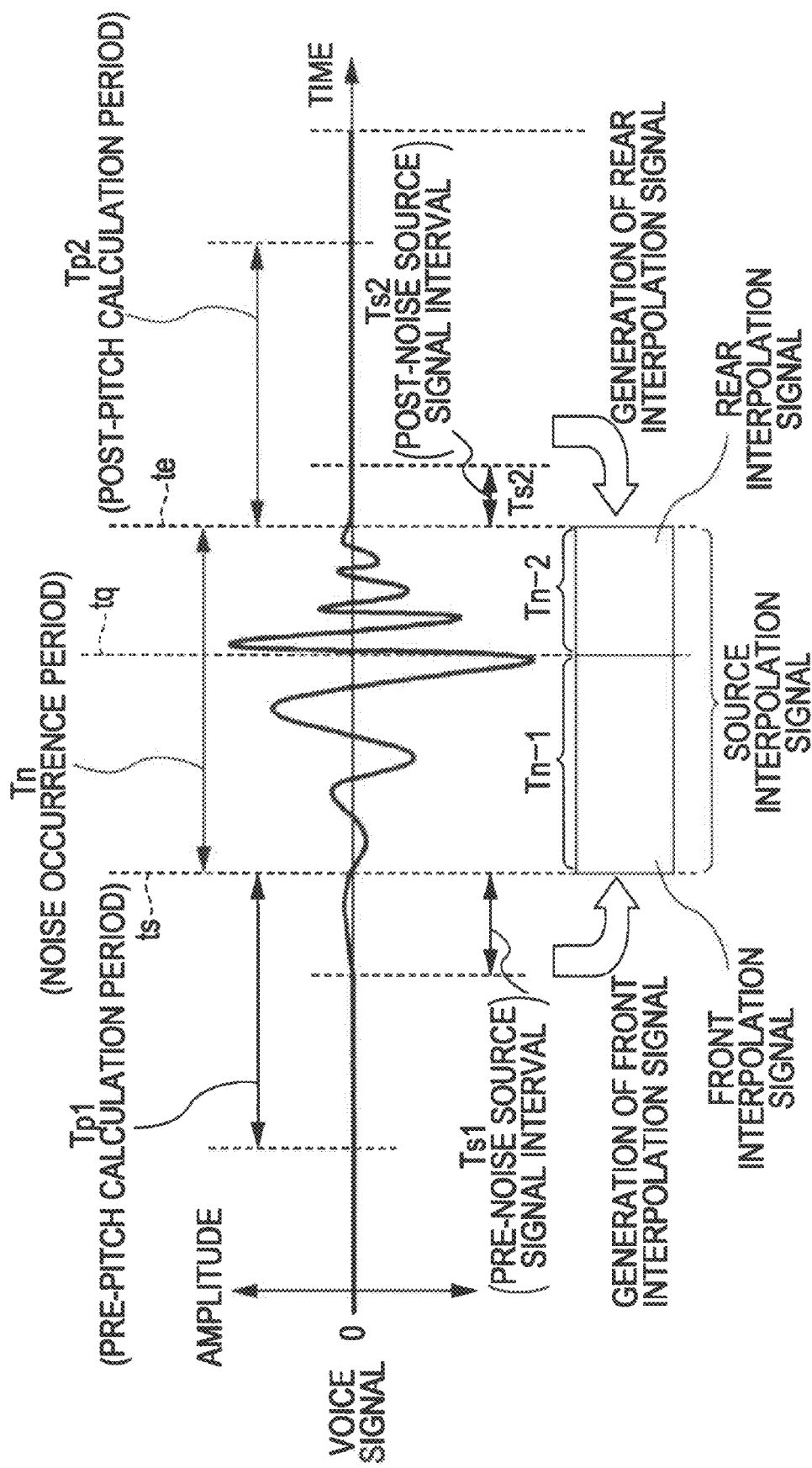

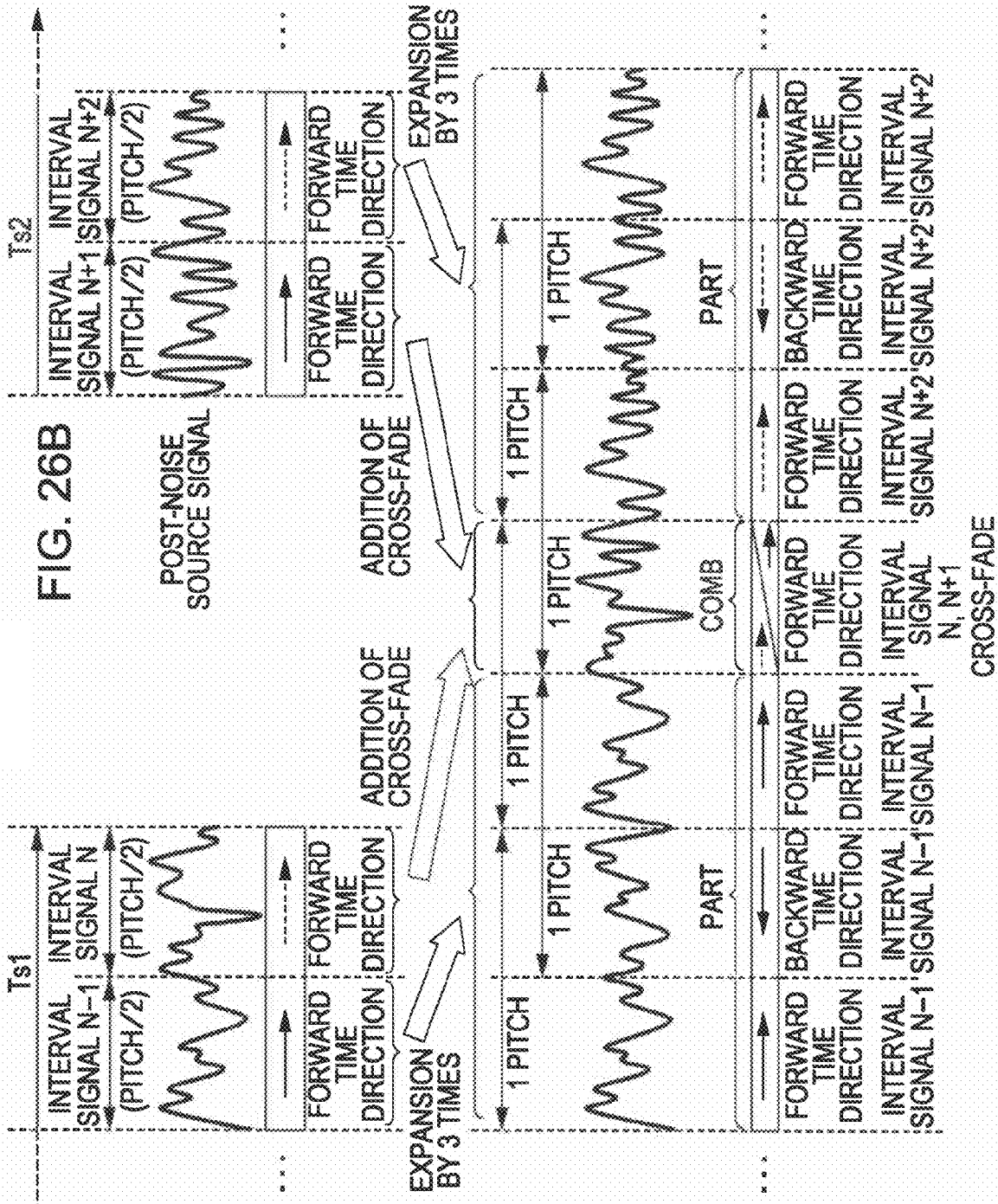

NOISE REDUCING APPARATUS AND NOISE REDUCING METHOD

BACKGROUND OF THE INVENTION

1. Field of the Invention

The present invention relates to a noise reducing apparatus and a noise removing (reducing) method capable of reducing a noise contained in a voice signal, for example.

2. Description of the Related Art

An electronic apparatus such as a video camera, a digital camera, a cellular phone, or an IC recorder has a microphone therein. In such an electronic apparatus, a noise, such as a head seek sound or a retract sound of an inner disk driver or the like, a lens drive sound of a lens mechanism, or a click sound or a touch sound of a user operation, may irregularly occur intermittently over time. In such an electronic apparatus, a problem may arise in that a microphone picks up the noise.

In order to solve this problem, Japanese Unexamined Patent Application Publication No. 2008-52772, Japanese Unexamined Patent Application Publication No. 2008-71374, and Japanese Unexamined Patent Application Publication No. 2008-77707 suggest configurations configured to detect noise occurrence time from a voice signal or the sensor output of a vibration sensor and removing (reducing) a noise of the voice signal during a period corresponding to the detected noise occurrence time.

SUMMARY OF THE INVENTION

When a removing target noise irregularly occurs intermittently over time, it is necessary to recognize the noise occurrence status exactly and perform a noise removing process on the basis of the recognition result. This is because it is advantageous in terms of effective use of resources and sound.

It is desirable to determine an occurrence status of a removing target noise more exactly than ever before so as to remove the noise.

According to an embodiment of the invention, there is provided a noise reducing apparatus having the following configuration.

The noise reducing apparatus includes: voice signal inputting means for inputting a voice signal to acquire an input voice signal; noise occurrence period detecting means for detecting a noise occurrence period of the input voice signal; noise removing means for removing a noise occurring for the noise occurrence period from the input voice signal; generation source signal acquiring means for acquiring a generation source signal with a time duration determined to correspond to a time duration corresponding to the noise occurrence period from a use voice signal being used to generate an interpolation signal; pitch calculating means for calculating a pitch of an input voice signal interval near the noise occurrence period in the input voice signal input by the voice signal inputting means; interval signal setting means for setting interval signals divided in each unit period interval set on the basis of the pitch calculated by the pitch calculating means from the generation source signal; interpolation signal generating means for generating an interpolation signal with the time duration corresponding to the noise occurrence period on the basis of arrangement of unit interpolation signal parts, which are formed by connecting the interval signals of the same unit period interval, on a time axis and for alternately arranging the interval signal in a forward time direction and the interval signal in a backward time direction at least in the unit interpolation signal part; and combining means for combining and outputting the interpolation signal and the input voice signal, from which the noise is removed by the noise removing means.

With such a configuration, the noise is removed from the input voice signal for the noise occurrence period, and then the interpolation signal is generated to interpolate the voice lost due to the removal of the noise as follows.

That is, the unit interpolation signal parts are formed by connecting the interval signals, where the time direction of the generation source signal is reversed, in each predetermined unit period interval corresponding to the pitch of the input voice signal, and then the interpolation signal is generated by arranging the unit interposition signal parts in a time series.

The interpolation signal generated in this way is considered as an interpolation signal of the frequency characteristic corresponding to the pitch of the input voice signal. Since the amplitude waveforms can be connected to each other in the boundary of the interval signals, the harmonics can be inhibited.

According to the embodiments of the invention, a high-quality interpolation signal can be obtained. Moreover, when the interpolation process is performed on the voice signal after the noise removal by the interpolation signal, a high-quality voice can be obtained for the voice signal subjected to the interpolation.

BRIEF DESCRIPTION OF THE DRAWINGS

FIGS. 8A to 8B are diagrams illustrating examples of a division frequency signal expressed in a time series of sampling points.

FIG. 11 is a diagram schematically illustrating a matching range of the coefficient pattern in a matching table according to the embodiment.

FIG. 12 is a diagram illustrating a detailed example of the matching table according to the embodiment.

FIGS. 24A and 24B are diagrams schematically illustrating the pitch correspondence interpolation signal generating process of the second example.

FIG. 25 is a diagram schematically illustrating the flow of pitch calculation and generation of a source interpolation signal of pitch correspondence interpolation signal generating process (third example), which is applicable to the noise reducing apparatuses of the third and fourth examples.

FIGS. 26A, 26B and 26C are diagrams schematically illustrating the pitch correspondence interpolation signal generating process of the third example.

DESCRIPTION OF THE PREFERRED EMBODIMENTS

Hereinafter, a preferred embodiment (hereinafter, referred to as an embodiment) of the invention will be described in the following order.
1. Overall Flow of Noise Removing Process
2. Exemplary Configuration of Noise Recognition Processor (First Example)
  2-1. Overall Configuration
  2-2. FFT Process
  2-3. Peak Detection
  2-4. Polynomial Calculation/Normalization Process
  2-5. Process of Determining whether Noise Is Present
3. Exemplary Configuration of Noise Recognition Processor (Second Example)
4. Exemplary Configuration of Noise Reducing Apparatus (first Example)
  4-1. Overall Configuration
  4-2. Process of Determining Noise Occurrence Period
5. Exemplary Configuration of Noise Reducing Apparatus (Second Example)
6. Exemplary Configuration (Third Example) of Noise Reducing Apparatus
  6-1. Exemplary Overall Configuration
  6-2. Interpolation Signal Generating Process Based on Pitch (First Example)
  6-3. Interpolation Signal Generating Process Based on Pitch (Second Example)
  6-4. Interpolation Signal Generating Process Based on Pitch (Third Example)
7. Exemplary Configuration of Noise Reducing Apparatus (Fourth Example)

Hereinafter, the phrase, removal of a target noise, and the phrase, reduction in a target noise, will be used. In the specification, however, the phrase, the removal of a target noise, and the phrase, the reduction in a target noise, are used with the same meaning. The phrase, the removal of a target noise, is used for a process of removing noise overlapping in a voice signal. The meaning of the removal of a noise includes a case where the noise is not completely removed but some components of the noise remain to some extent. The phrase, the reduction in a noise, is a phrase used in terms of the result of the noise removing process in this way.

1. Overall Flow of Noise Removing Process

Figure 1:
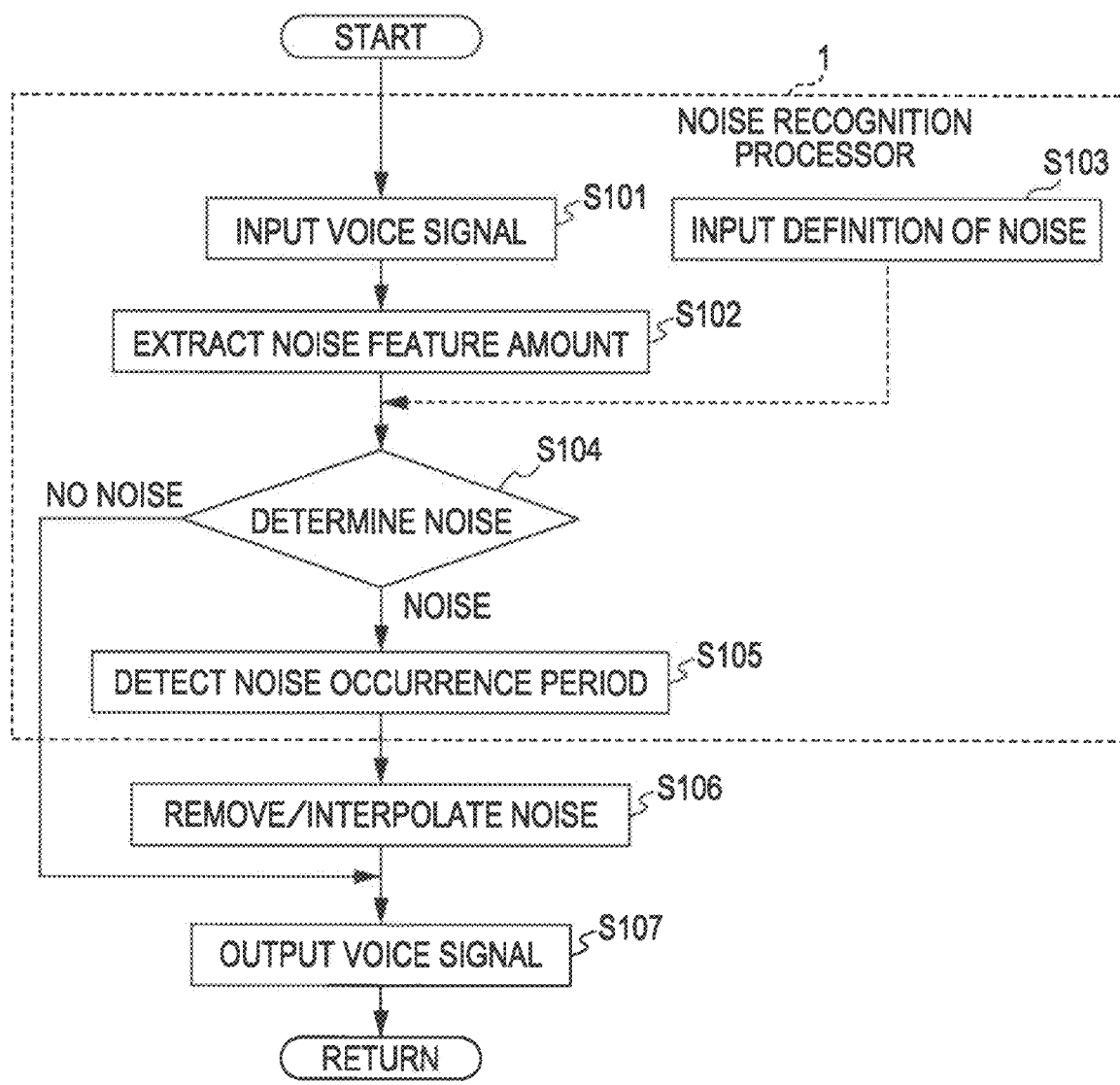
FIG. 1 is a flowchart illustrating the sequential flow performed in a noise reducing apparatus according to an embodiment of the invention.

FIG. 1 is a flowchart illustrating the overall order of a noise reducing process performed in a noise reducing apparatus according to an embodiment.

The noise reducing apparatus according to this embodiment reduces a noise that overlaps in a voice and irregularly occurs intermittently over time. The noise that irregularly occur intermittently over time may arise from a generation source such as a head seek sound or a retract sound of an inner disk driver, when an electronic apparatus is a record reproducing apparatus having the disk driver therein, for example. When an electronic apparatus includes an imaging unit such as a video camera or a digital camera, a lens drive sound of a lens mechanism and a click sound or a touch sound of a user operation become the generation source of a noise.

In step S101 of FIG. 1, a voice signal that is likely to combine with a removing target noise is first input. The source of the voice signal input in step S101 is a sound or the like generated by a microphone, as described below.

In step S102, the feature amount (noise feature amount) of a voice corresponding to a noise is extracted from the voice signal input in step S101. At this time, the specific feature amount of the voice is extracted from the voice signal on the basis of a definition of a noise given in step S104.

In step S103, information regarding the noise feature amount of the extracted in step S102 is compared to information regarding the definition of a noise input in step S104. The information regarding the definition of a noise contains data on the noise feature amount obtained from the sound of a noise occurring from a presupposed generation source.

As the comparison result in step S104, when a similarity ratio between the information regarding the definition of a noise and the information regarding the noise feature amount is equal to or larger than a certain value, it is determined that there is noise. Alternatively, when the similarity ratio is equal to or smaller than a certain value, it is determined that no noise is present.

When it is determined in step S104 that no noise is present, the voice signal input in step S107 is output without performing the noise removing process.

Alternatively, when it is determined that a noise is present, the processes in step S105 and S106 are performed.

In step S105, a noise occurrence period is detected. That is, until step S104, it is detected whether a noise is present. In step S105, an occurrence period (occurrence time) of the detected noise is detected.

In step S106, a process is performed to remove a noise occurring from the voice signal input in step S101 during the noise occurrence period detected in step S105.

When a voice component is removed as the noise in the noise removing process, voice information corresponding to the voice component removed as the noise may be omitted in a noise removing target interval of the originally input voice signal. In this case, in order to supplement the omission of the voice information, a process of interpolating the voice signal component is performed. Subsequently, in step S107, the voice signal subjected to the noise removal and interpolation is output.

2. Exemplary Configuration of Noise Recognition Processor (First Example)

2-1. Overall Configuration

The processes of step S101 to 5105 shown in FIG. 1 are processes that are generally performed in a noise recognition processor 1 of the noise reducing apparatus according to this embodiment.

Figure 2:
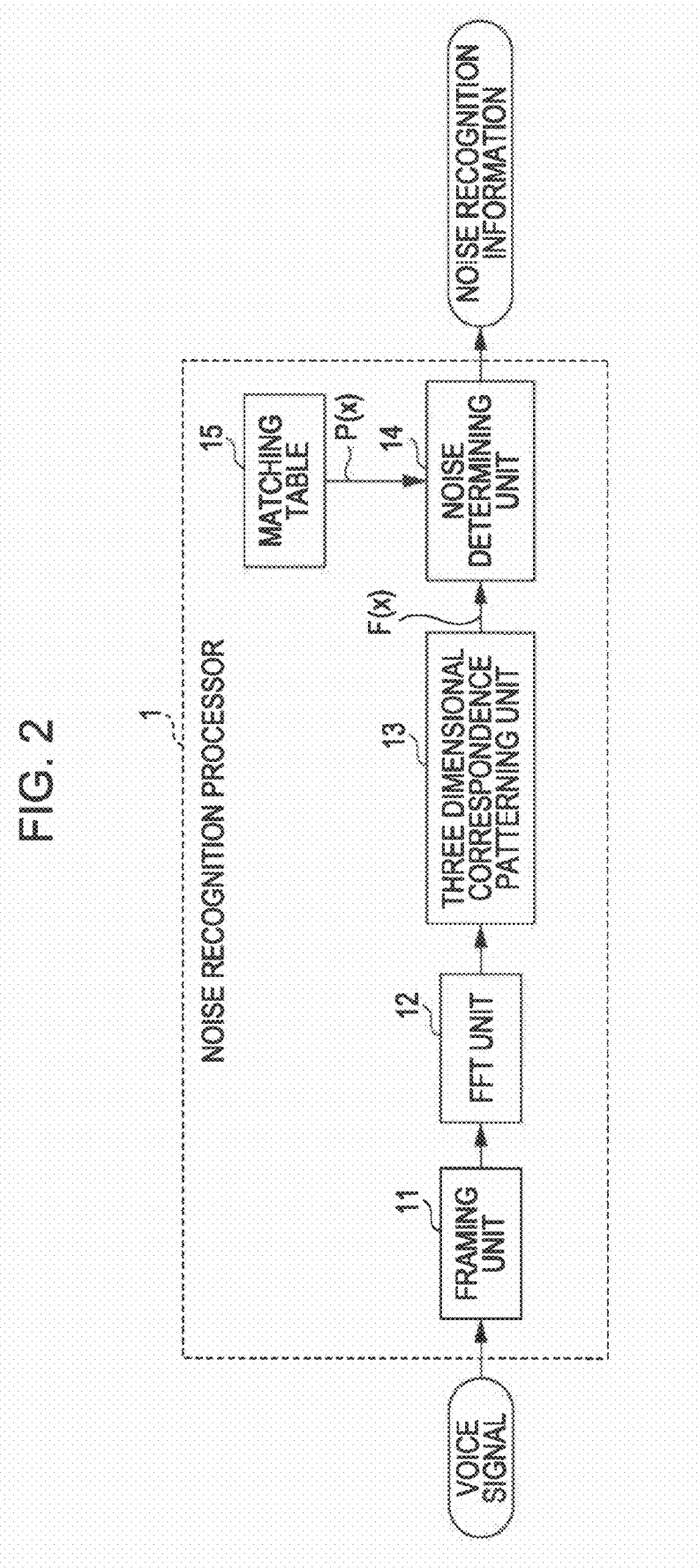
FIG. 2 is a block diagram illustrating an exemplary configuration of a noise recognition processor (first example) according to the embodiment.

FIG. 2 is a diagram illustrating the overall configuration as a first example of the configuration of the noise recognition processor 1 performing the processes of steps S101 to S105 shown in FIG. 1.

A noise reduction processor 1 shown in FIG. 2 includes a framing unit 11, an FFT unit 12, a three dimensional correspondence patterning unit 13, a noise determining unit 14, and a matching table 15.

The framing unit 11 inputs the voice signal in step S101 in FIG. 1. The process of extracting the noise feature amount in step S102 is performed in the framing unit 11, the FFT unit 12, and the three dimensional correspondence patterning unit 13.

2-2. FFT Process

In this embodiment, the voice signal input on a time axis is transformed to a signal (frequency signal) of a frequency area by the FFT (Fast Fourier Transform).

The framing unit 11 performs a process of processing the input voice signal in a frame unit, which is a unit of the FFT process, before the FFT process.

The voice signal input by the framing unit 11 is real data (time area data) of a time area formed by a predetermined sampling frequency fs and a quantization bit rate. For example, when the sampling frequency fs of the input voice signal is 44.1 kHz, the framing unit 11 forms one frame by using the data number of 1024 corresponding to a predetermined time duration, as shown in FIG. 3A.

The FFT unit 12 performs the FFT process in each data of one frame to transform the data to frequency area data (frequency signal) formed by real data Re and imaginary data Im, as shown in FIGS. 3B and 3C. In this way, by expressing the frequency area data as complex data, wave representation containing phases in the frequency area is possible.

When the data number of one frame is 1024 and the sampling frequency fs is 44.1 kHz, as in FIG. 3A, the Nyquist frequency is 22.05 kHz (44.1 kHz/2) and the data number is 512 in the real data Re and the imaginary data Im, as in FIGS. 3B and 3C. The frequency resolution of each of the real data Re and the imaginary data Im is about 43 Hz (22.05 kHz/512: Nyquist frequency/data number). That is, in this case, by performing the FFT process, it is possible to obtain a frequency signal containing data for each frequency (hereinafter, referred to as a division frequency) obtained by dividing the frequency band range from 0 to 22.05 kHz by 512 in a unit of 43 Hz.

The data of the frequency signal output by the FFT unit 12 can be obtained as the following absolute value amplitude Va, for example.

$$\text{Absolute Value Amplitude } Va = \sqrt{(Re)^2 + (Im)^2} \quad \text{Equation 1}$$

The absolute value amplitude Va by Equation 1 is calculated using the real data Re of the same division frequency among 512 data forming the real data Re and the imaginary data Im in the example of FIGS. 3A to 3C. In one frame, 512 absolute value amplitudes Va are obtained to correspond to each division frequency.

In this embodiment, the three dimensional correspondence patterning unit 13 on the rear stage of the FFT unit 12 input the absolute value amplitudes Va to perform the process.

Figure 4:
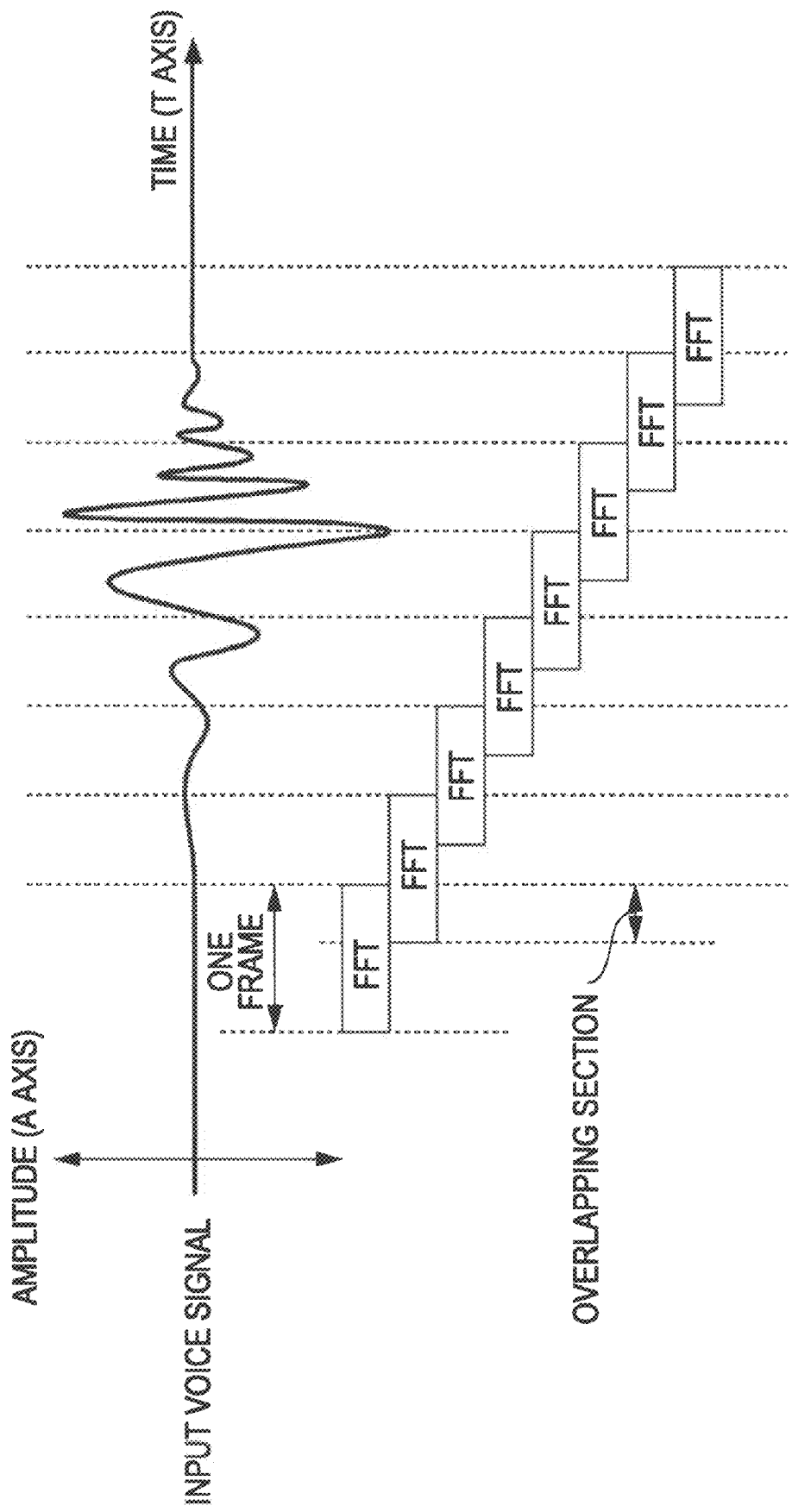
FIG. 4 is a diagram schematically illustrating an example of an FFT process in a frame unit performed in the FFT unit according to the embodiment.

The framing unit 11 according to this embodiment frames the input voice signal by forming an overlapping interval between previous and rear frames along the time axis (T axis) of the input voice signal, as shown in FIG. 4. The FFT unit 12 performs the FFT process on each frame obtained in this way to convert the voice signal to a frequency signal.

Here, the reason for forming the overlapping interval between the front and rear frames in this way is as follows.

The FFT process is performed on the plurality of data of the frame. Therefore, in the FFT process in the vicinity of the initial/end positions of the frame, data before the start position or the end position of one frame has to be used primarily. However, since the data may not be used, it is difficult to obtain an exact value from the data after the FFT process.

However, when the overlapping interval is formed, the FFT process in the vicinity of the initial/end positions of one frame is performed appropriately using all of the data necessary in overlapping another frame. In this way, by improving time resolution for the FFT process, it is possible to obtain the calculation result of the FFT process more exactly.

An overlapping ratio in the overlapping interval, that is, a time ratio of front and rear frames overlapping with one frame has to be set appropriately in the range from 0% to a value less than 100% in consideration of the balance between the frequency resolution and the time resolution of the FFT process.

2-3. Peak Detection

The frequency signal obtained by the FFT unit 12 is output to the three dimensional correspondence patterning unit 13 in FIG. 2.

The three dimensional correspondence patterning unit 13 makes a polynomial for each noise component of the voice signal on the basis of the frequency signal obtained by the FFT unit 12 to obtain a coefficient pattern of the polynomial, as described below. That is, the noise pattern recognition (patterning) is carried out. The noise pattern recognition corresponds to the extraction of the noise feature amount in step S102.

Figure 5:
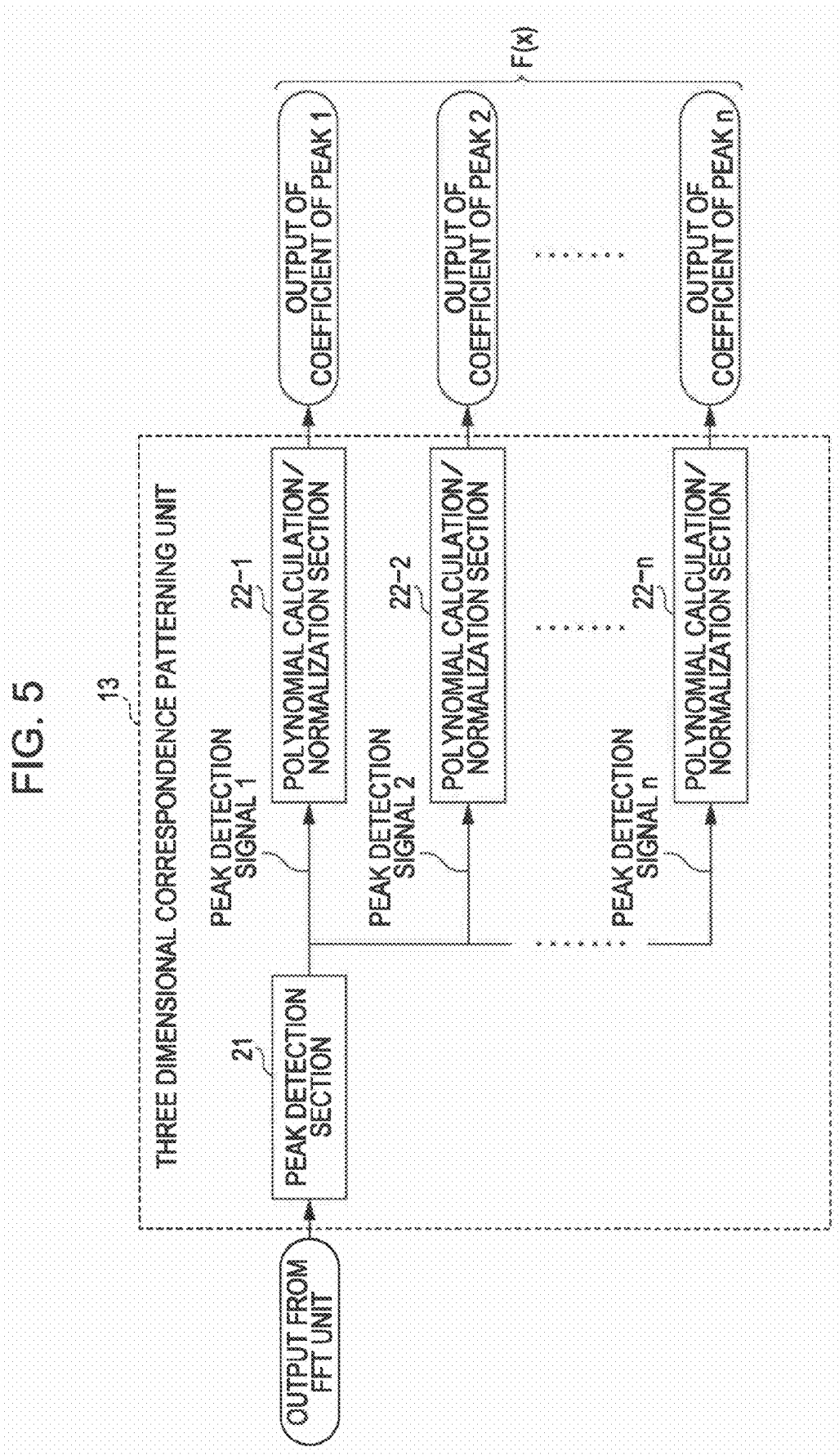
FIG. 5 is a diagram illustrating an exemplary configuration of a three dimensional correspondence patterning unit according to the embodiment.

An exemplary configuration of the three dimensional correspondence patterning unit 13 is illustrated in FIG. 5.

The three dimensional correspondence patterning unit 13 shown in FIG. 5 includes a peak detection section 21 and n polynomial calculation/normalization section 22-1 to 22-n.

The frequency signal output from the FFT unit 12 is input to the peak detection section 21.

As described above, the frequency signal from the FFT unit 12 includes the real data Re and the imaginary data Im shown in FIGS. 3B and 3C. For example, 512 absolute value amplitudes Va(1) to Va(512) calculated by Equation 1 can be obtained for each data of the real data Re and the imaginary data Im, that is, each of bands (division frequencies) 1 to 512 with the frequency resolution of about 43 Hz in the example of FIGS. 3A to 3C.

Figure 6:
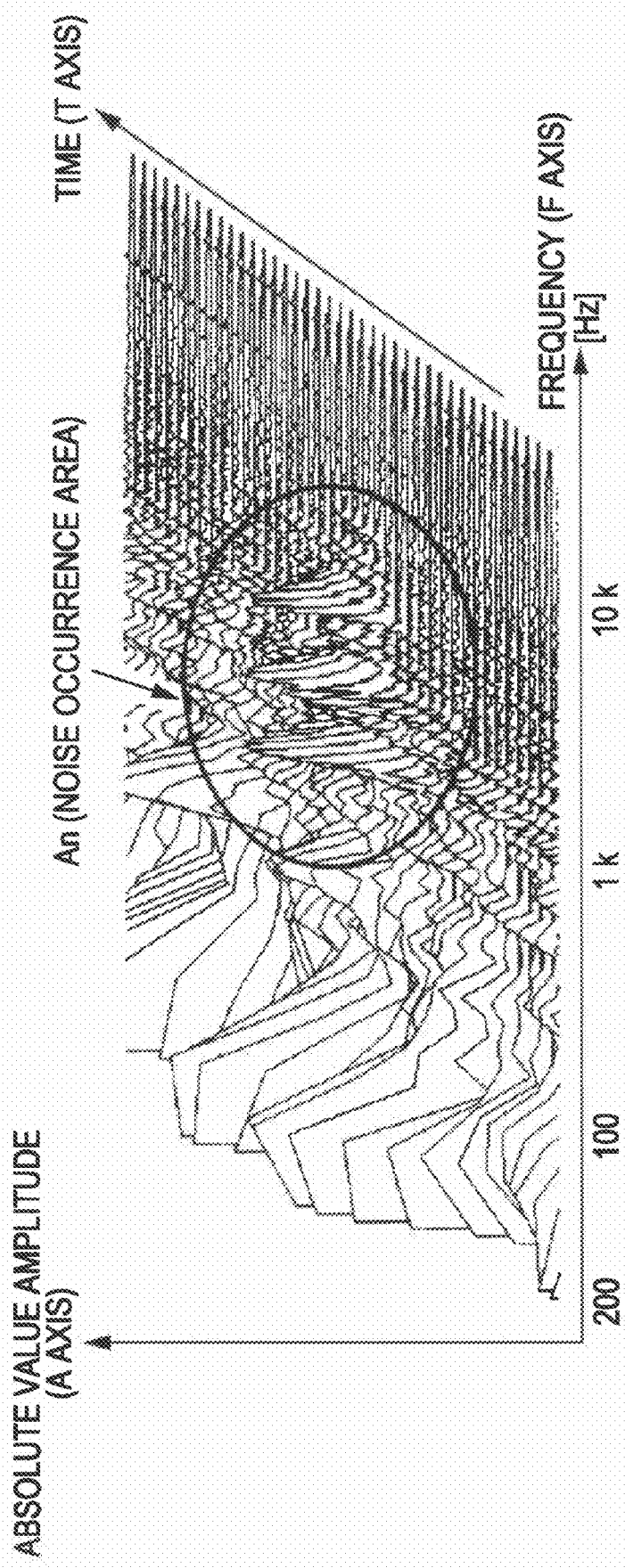
FIG. 6 is a diagram illustrating three dimensional waveforms as the result processed by the FFT unit according to the embodiment.

As an exemplary result processed by the FFT unit 12, a three dimensional waveform is illustrated in FIG. 6. The three dimensional waveform, which is the frequency signal obtained by the FFT unit 12, may be formed by collection of 512 absolute value amplitudes Va(1) to Va(512) obtained in each frame.

In the three dimensional waveform, a frequency axis (F axis) and a time axis (T axis) are perpendicular to each other in the planar direction, an A axis represent a value of the absolute value amplitude in the vertical direction. Here, in an area portion An surrounded by a full line in the three dimensional waveform, three peaks are obtained in different frequency bands. The waveform portion protruding more than the vicinity in the peaks corresponds to an area where a noise occurs in effect. That is, the area portion An represents a time-frequency area (noise occurrence area) where a noise occurs.

The peak detection section 21 in FIG. 5 detects a peak of the three dimensional waveform, as illustrated in the noise occurrence area An in FIG. 6, for example.

Figure 7:
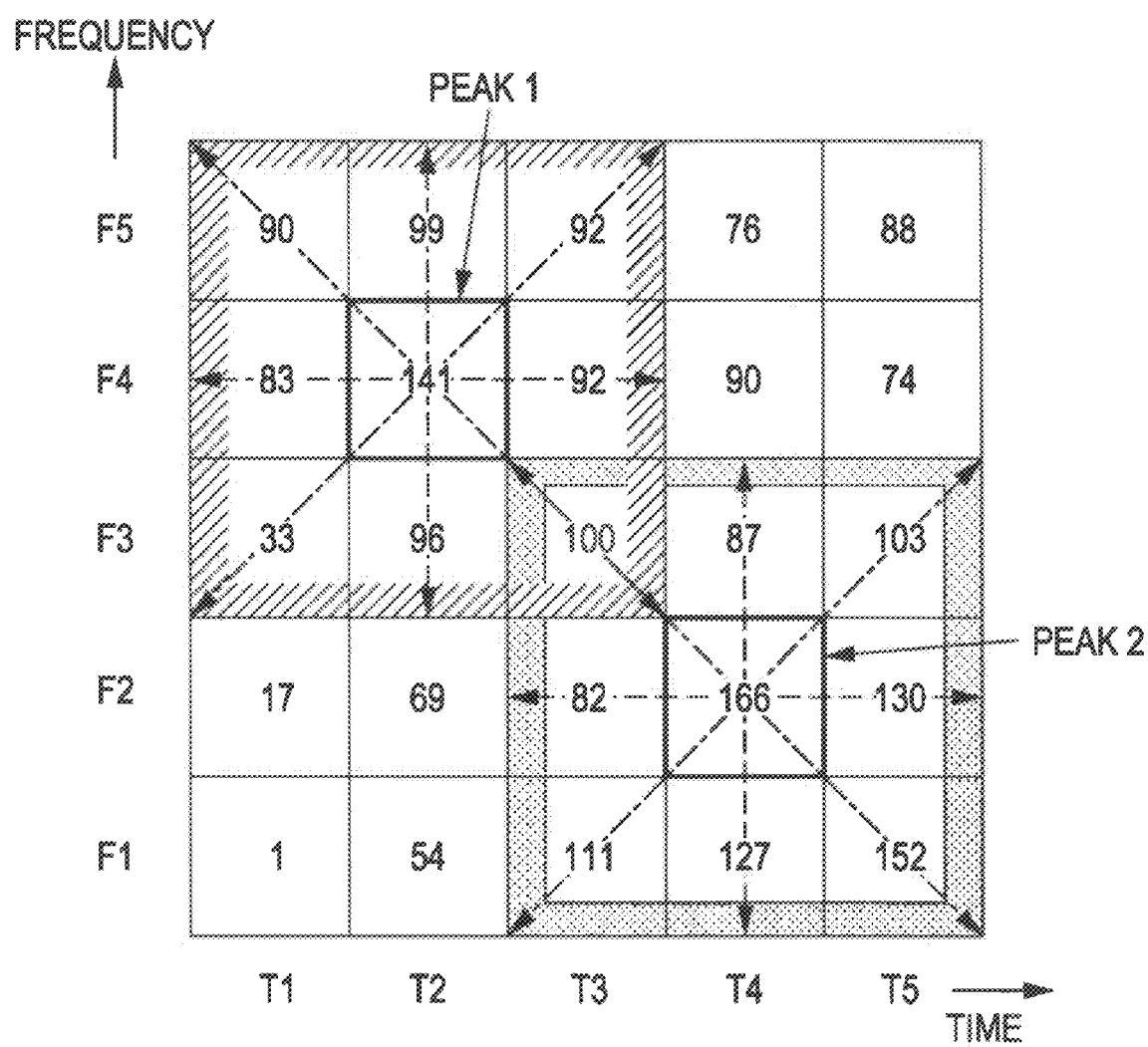
FIG. 7 is a diagram schematically illustrating a peak detecting process performed by a peak detection section according to the embodiment.

Therefore, the peak detection section 21 performs data mapping by using data (absolute value amplitude data at each division frequency) of the input frequency signal to obtain map data shown in FIG. 7. This map data expresses the three dimensional waveform illustrated in FIG. 6.

In the map data in FIG. 7, the horizontal axis represents time and the vertical axis represents a frequency.

Here, a matrix of times T1, T2, T3, T4, T5 . . . and frequencies F1, F2, F3, F4, F5 . . . is formed as a part of the map data. Each of the frequencies F1, F2, F3, F4, F5 . . . corresponds to each division frequency corresponding to each of 512 data including the real data Re and the imaginary data Im. Each of the times T1, T2, T3, T4, T5 . . . corresponds to a time at which one frame is obtained.

In the correspondence in FIG. 7, the peak detection section 21 performs mapping of the absolute value amplitudes 1, 17, 33, 83, 90 . . . corresponding to the frequencies (division frequencies) F1, F2, F3, F4, F5 . . . from the frequency signal obtained at time T1 in one frame. Subsequently, the absolute value amplitudes corresponding to the frequencies F1, F2, F3, F4, F5 . . . are sequentially mapped from the frequency signal of a frame unit input so as to correspond to times T2, T3, T4, T5.

When the map data is prepared in this way, the peak detection section 21 detects the peaks of the absolute value amplitudes Va equal to or larger than 1 from an amplitude value distribution of the map data. In a peak detecting algorithm using the map data, a collection of masses (sampling points) of a 3 by 3 matrix is set to a peak detection range.

Subsequently, the peaks are searched in the same time direction and the same frequency direction in the peak detection range, as indicated by dash line arrows. When the peak is obtained as the search result at the same sampling point in the time direction and the frequency direction, the time-frequency coordinates corresponding to the sampling point are set to a first temporary peak point.

In addition, the peaks are searched in two directions perpendicular to the time direction/frequency direction in the same peak detection range so as to exceed the frequency and the time, as indicated by a one-dot chain line. When the peak is obtained as the search result at the same sampling point in the time direction and the frequency direction, the time-frequency coordinates of the sampling point are set to a second temporary peak point.

When the first temporary peak point is the same as the second temporary peak point, the time-frequency coordinates of the sampling point are set to a true peak point.

In the example of FIG. 7, coordinates (T2, F4) of the sampling point with absolute value amplitude 141 and coordinates (T4, F2) of the sampling point with absolute value amplitude 166 are set as the peaks detected on the map data by the peak detecting algorithm.

In this embodiment, when the peaks are detected in the division frequency signal, a variation in a time series corresponding to the division frequency is shown together with a variation in the amplitude in the frequency direction. That is, the peaks are detected on the basis of the two dimensional distribution of the absolute value amplitude formed by the frequency axis and the time axis. Accordingly, the peaks are detected more exactly.

The peak detecting method is just an example. In effect, the number of sampling points formed in the peak detection range may increase further. Moreover, in the axes searched to detect the peaks, at least one of the four directions used in the peak detecting method may be selected.

2-4. Polynomial Calculation/Normalization Process

In FIGS. 8A and 8B, time-series band signals (division frequency signals) obtained on the basis of the frequency signal output from the FFT unit 12 are depicted with a variation of the absolute value amplitude over time in specific frequencies Fa and Fb, respectively. The horizontal axis represents time (T axis) and the vertical axis represents the absolute value amplitude (A axis).

The voice signal according to this embodiment is digital data, and thus is discretely sampled over time. For example, in a band signal of a frequency Fa in FIG. 8A, the absolute value amplitudes of sampling points at times T1, T2, T3, T4, T5, T6, and T7 are A1$a$, A2$a$, A3$a$, A4$a$, A5$a$, A6$a$ and A7$a$. In addition, in a band signal of a frequency Fb in FIG. 8B, the absolute value amplitudes of sampling points at times T1, T2, T3, T4, T5, T6, and T7 are A1$b$, A2$b$, A3$b$, A4$b$, A5$b$, A6$b$ and A7$b$.

Here, the fact that the absolute value amplitude is discretely sampled over time means that the peak in the sampled absolute value amplitude does not necessarily indicate the peak of a true band signal.

For example, the value of the peak of the absolute value amplitude at the sampling points shown in FIG. 8A is A4$a$ at time T4. However, the true peak presumed by imaginarily connecting the absolute value amplitudes A1$a$ to A7$a$ at times T1 to T7 in a curve (indicated by a dash line in the drawing) is present before time T4.

Likewise, the value of the peak of the absolute value amplitude at the sampling points shown in FIG. 8B is A5$b$ at time T5. However, the true peak presumed by imaginarily connecting the absolute value amplitudes A1$b$ to A7$b$ at times T1 to T7 in a curve (indicated by a dash line in the drawing) is present before time T5.

In order to calculate a value that is approximate to the true peak value as closely as possible from the sampled absolute value amplitudes, the time resolution is made to be increased as one method. That is, the sampling frequency can be made to be increased. However, since the time resolution and the frequency resolution have a trade-off relationship, it is not preferable to increase the time resolution excessively. In order to increase the time resolution appropriately in consideration of the trade-off relationship, the overlapping interval is provided in the FFT process of a frame unit, as shown in FIG. 4, for example. However, when the overlapping ratio is increased, the processing amount becomes too large. Accordingly, the sampling points have to be made discrete at a corresponding time interval in effect.

The waveform of the band signal obtained in accordance with the detected peak may be different every time so as to know the waveform from the envelope curve of the sampling points indicated by each dash line in FIGS. 8A and 8B. This means that the waveform obtained in accordance with the peak detected by the peak detection section 21 is likely to have a noise waveform pattern and is likely to have a necessary sound waveform other than a noise.

Accordingly, information regarding the pattern corresponding to the waveform of which the true peak position is presumed with high precision is obtained when the peak of the sampling points is detected by the peak detection section 21. Subsequently, it is necessary to compare this pattern to a prepared noise pattern.

The polynomial calculation/normalization sections 22-1 to 22-n in the three dimensional correspondence patterning unit 13 perform the following process to obtain the pattern according to the detected peak.

The peak detection section 21 of the three dimensional correspondence patterning unit 13 outputs peak detection signals 1 to n for each of detected peaks 1 to n.

In the correspondence of FIG. 7, the peak detection section 21 first detects peak 1 of frequency F4 at time T2, and then outputs peak detection signal 1 corresponding to peak 1. Subsequently, the peak detection section 21 detects peak 2 of frequency F2 at time T4, and then outputs peak detection signal 2 corresponding to peak 2.

In the peak detection signal, the absolute value amplitude point of the sample position detected as the peak is set to a reference sampling point. Among the absolute value amplitude of the reference sampling point and the absolute value amplitudes of the sampling points with the same frequency as that of the reference sampling point, the absolute value amplitudes of N sampling points located immediately before the reference sampling point on the time axis and the absolute value amplitudes of N sampling points immediately after the reference sampling point on the time axis are first output.

Here, the N sampling points located immediately before and after the reference sampling point are determined in accordance with setting of the order of the polynomial calculated by the polynomial calculation/normalization sections 22 (22-1 to 22-n), as described below.

The polynomial calculation/normalization sections 22 first calculate a polynomial of a curve, which passes through the reference sampling point (having the absolute value amplitude) corresponding to one specific frequency input as the peak detection signal and N sampling points located respectively before and after the reference sampling point over time (hereinafter, the reference sampling point and the N sampling points located respectively before and after the reference sampling point are referred to as calculation sampling points), or a curve, which approximates the sampling points. Here, the sampling points refer to points of which the sampling time and the absolute value amplitude are represented by x and y axes, respectively.

The polynomial obtained in this way represents the waveform of the band signal where the peak is detected.

As a method of calculating the polynomial of a curve by interpolating a plurality of sampling points, that is, the coordinates thereof, there are known the Lagrange interpolation method, the spine interpolation method, least mean square approximation method, and the like. In this embodiment, any method can be used from amongst them. In the following description, the Lagrange interpolation method will be used.

The Lagrange interpolation method will be described simply.

It is assumed that data y0, y1, y2, ..., yn are present at n+1 discrete sampling points x0, x1, x2, ..., xn (where x0<x1<x2<...<xn). Function F(x) of the Lagrange interpolation curve passing through the points (x0, y0), (x1, y1), (x2, y2), ..., (xn, yn) is an n-order polynomial and can be obtained by Equation 2, which is described below.

$$F(x) = $$ Equation 2

$$y0 \cdot g0(x)/g0(x0) + y1 \cdot g1(x)/g1(x1) + y2 \cdot g2(x)/g2(x2) + $$

$$\ldots + yn \cdot gn(x)/gn(xn) = \sum_{i=0}^{n} \{yi(n) \cdot gi(x)/gi(xi)\}$$

$$gi(x) = L(x)/(x - xi), (i = 0, 1, 2, \ldots, n)$$

$$L(x) = (x - x0)(x - x1)(x - x2) \ldots (x - xn)$$

Figure 9A:
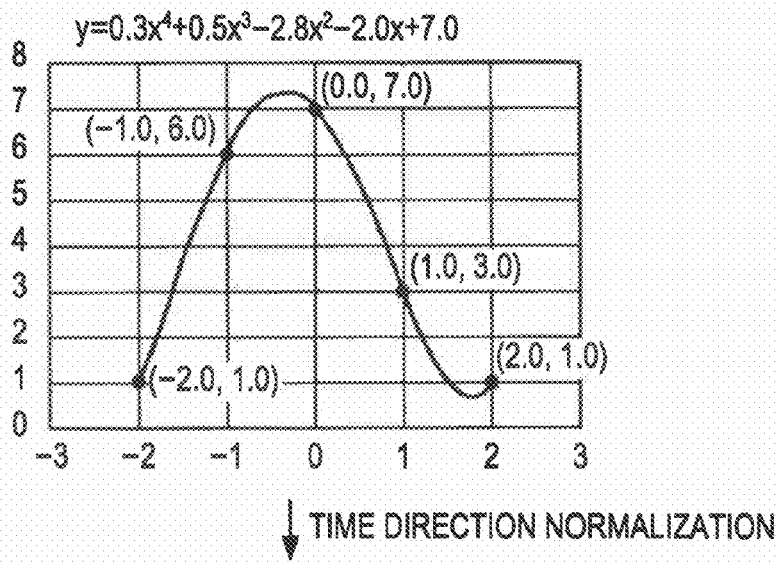
FIGS. 9A to 9C are diagrams illustrating an example where a quartic polynomial for the division frequency signal, where a peak is detected, is normalized in a time axis direction and an amplitude axis direction.

An example where the band signal where the peak is detected on the basis of the peak detection signal is expressed by a quartic polynomial is shown in FIG. 9A.

In the quartic polynomial, five (=n+1) sampling points are necessary. Accordingly, as for the peak detection signal in this case, the reference sampling point and two sampling points located respectively before and after the reference sampling point over time at the same frequency as that of the reference sampling point are output to the polynomial calculation/normalization sections 22.

In FIG. 9A, five coordinates (0.0, 7.0), (−1.0, 6.0), (−2.0, 1.0), (1.0, 3.0), and (2.0, 1.0) are shown as five sampling points.

Among these coordinates, the coordinates (0.0, 7.0) are the reference sampling point, the coordinates (−1.0, 6.0) and (−2.0, 1.0) are the two sampling points located immediately before the reference sampling point, and the coordinates (1.0, 3.0) and (2.0, 1.0) are the two sampling points located immediately after the reference sampling point.

The polynomial calculation/normalization sections 22 calculate the quartic polynomial passing through these sampling points. The quartic polynomial is shown in Expression 1.

$$F(x) = 0.3x^4 + 0.5x^3 - 2.8x^2 - 2.0x + 7.0$$ Expression 1

The curve shown in FIG. 9A is obtained by Expression 1.

As known from the curve of FIG. 9A, the maximum value (extreme value) of the quartic polynomial obtained by Expression 1 is different from the y coordinate value of the reference sampling point. That is, in this embodiment, by forming a higher polynomial, the waveform that is more approximate to the true waveform can be obtained in the band signal (division frequency signal). In this way, the peak level and peak time of the band signal can be obtained more exactly.

The polynomial process is a process of forming the three dimensional frequency signal by adding the time axis (the x axis in FIGS. 9A to 9C and FIGS. 10A to 10C) to the two dimensional frequency signals having the frequency axis and the amplitude axis.

Subsequently, the polynomial calculation/normalization sections 22 normalize the quartic polynomial obtained by Expression 1. This normalization is a process of approximating the coefficients of the odd number terms to 0 or a value sufficiently considered as 0 and simplifying a comparison process with the matching table 15 to determine a noise, as described below.

Figure 9B:
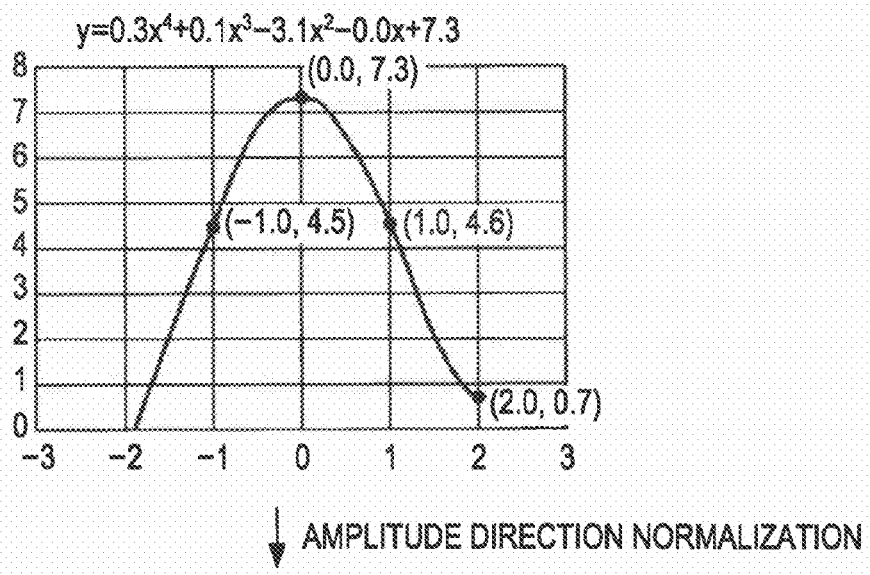

In order to perform the normalization, the polynomial calculation/normalization sections 22 first carry out conversion of the quartic polynomial by permitting the x coordinate of the maximum value calculated initially by the quartic polynomial to become 0, as shown in FIGS. 9A and 9B, that is, the polynomial calculation/normalization sections 22 carry out the normalization in the X axis direction, that is, the time axis direction.

The quartic polynomial representing the curve shown in FIG. 9B, that is, the quartic polynomial obtained by the normalization in the time axis direction is shown in Expression 2.

$$F(x)=0.3x^4+0.1x^3-3.1x^2+7.3 \quad \text{Expression 2}$$

As known by comparing Expression 2 to Expression 1, the-odd order coefficient of $x^3$ is converted to 0.1, that is, the value considered sufficiently as 0. Moreover, the coefficient of the odd number term of x is converted to 0.

The above-described normalization in the time axis direction is based on the fact that the removing target "noise that irregularly occurs intermittently over time" increases and decreases relatively sharply during a certain time. That is, the waveform of the noise having this property is bilaterally symmetrical with reference to the peak point. Accordingly, the noise has a strong tendency to have a curve of the even function. Moreover, when the normalization in the time axis direction is carried out, as in FIG. 9B, the coefficient of odd number term is converted to 0 or a value corresponding to 0. In this way, a change in a coefficient pattern, which is described below, is inhibited and the coefficient pattern of the matching range prepared in the matching table 15 also becomes restrictive. Therefore, capacity becomes small.

Figure 9C:
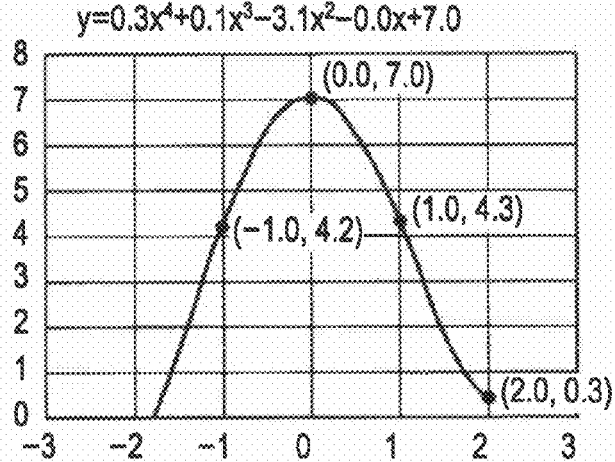

The polynomial calculation/normalization sections 22 also carries out the normalization the amplitude axis direction, as known from the transition in FIGS. 9B and 9C. That is, the coordinates of the maximum value shown in FIG. 9B is (0.0, 7.3). The intercept of the Y coordinate value 7.3 is shown, but the value of the intercept at this time is not an integer value. Therefore, the polynomial calculation/normalization sections 22 carry out the normalization to make the value of the intercept an integer value. Here, the normalization is carried out so that the value of the intercept becomes an integer value that is the closest to the value of the coordinates of the intercept before the normalization.

In this way, Expression 3 is obtained as the quartic polynomial. The coordinates of the maximum value in the curve are (0.0, 7.0), as shown in FIG. 9C.

$$F(x)=0.3x^4+0.1x^3-3.1x^2+7.0 \quad \text{Expression 3}$$

When the intercept becomes the integer value in this way, only integer values are necessary for the values of the intercept in the coefficient pattern. Therefore, the coefficient pattern can be simplified more easily.

Figure 10A:
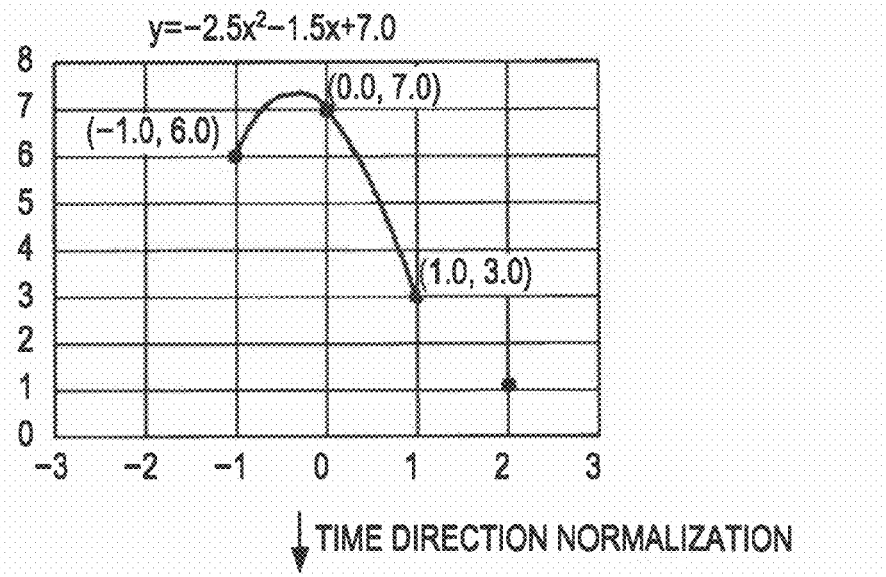
FIGS. 10A to 10C are diagrams illustrating an example where a quadratic polynomial for the division frequency signal, where a peak is detected, is normalized in a time axis direction and an amplitude axis direction.
Figure 10B:
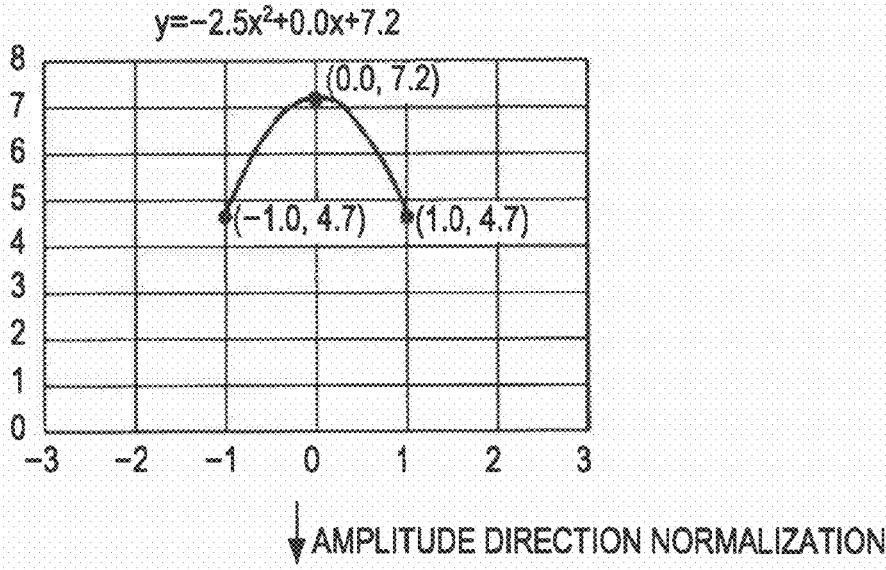
Figure 10C:
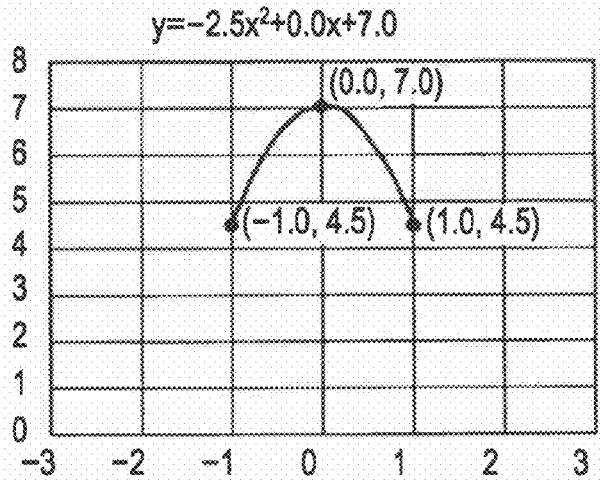

A case where the band signal, where the peak is detected, in FIGS. 9A to 9C is made to be expressed as a quadratic polynomial will be described with reference to FIGS. 10A to 10C.

In the quadratic polynomial (where n=2), the polynomial calculation/normalization sections 22 take the reference sampling point and each one sampling point located before and after the reference sampling point over time, that is, the total 3 (=n+1) sampling points, as the peak detection signal. Then, in the case of the same band signal as that in FIGS. 9A to 9C, three sampling points of (0.0, 7.0), (−1.0, 6.0), and (1.0, 3.0) are obtained as the peak detection signal, as in FIG. 10A.

The quadratic polynomial obtained using these sampling points by the Lagrange interpolation method is Expression 4. The curve is shown in FIG. 10A.

$$F(x)=-2.5x^2-1.5x+7.0 \quad \text{Expression 4}$$

Next, the quadratic polynomial obtained by normalizing Expression 4 in the time axis direction is Expression 5. The curve of the quadratic polynomial obtained by the normalization in the time axis direction is shown in FIG. 10B.

$$F(x)=-2.5x^2+7.2 \quad \text{Expression 5}$$

As known from Expression 5, the coefficient of the odd number term of x becomes 0 by the normalization in the time axis direction.

In addition, the quadratic polynomial obtained by normalizing Expression 5 in the amplitude axis direction is Expression 6. The curve of the quadratic polynomial obtained by the normalization in the time axis direction is shown in FIG. 10C.

$$F(x)=-2.5x^2+7.0 \quad \text{Expression 6}$$

Here, the quartic polynomial and the quadratic polynomial are used as the examples of the polynomial normalized in the polynomial calculation/normalization sections 22. However, in this embodiment, a sextic polynomial or polynomials other than the quartic polynomial and the quadratic polynomial may be used, for example.

In the above description of the normalization, the normalization in the time axis direction has first been carried out, and then the normalization in the amplitude axis direction has been carried out. In effect, however, the normalization may be converged finally by appropriately carrying the normalization in the time axis direction and the amplitude axis direction, and the normalization in the time axis direction and the normalization in the amplitude axis direction may alternately be carried out until the convergence is completed.

When the polynomial and the normalization of the band signal, where the peak is detected, is completed, the polynomial calculation/normalization sections 22 output data representing the coefficients of the normalized polynomial.

That is, the quartic polynomial can be expressed as $F(x)=ax^4+bx^3+cx^2+dx+e$. Accordingly, the polynomial calculation/normalization sections 22 output data representing combination of the coefficients [a, b, c, d, and e] of the normalized quartic polynomial. Here, the intercept (e) is used as the coefficient of $x^0$.

In addition, the quadratic polynomial can be expressed as $F(x)=ax^2+bx+c$. Accordingly, the polynomial calculation/normalization sections 22 output data representing a combination of the coefficients [a, b, and c] of the normalized quadratic polynomial.

The polynomial calculation/normalization sections 22-1 to 22-n output data (coefficient data of peak 1 to coefficient data of peak n) that represent the combination of the coefficients for the corresponding band signal, respectively. The coefficient data of peak 1 to the coefficient data of peak n are the output of three dimensional correspondence patterning unit 13. That is, the coefficient data of peak 1 to the coefficient data of peak n are the data in which the band signal assumed as the band signal, where the peak is detected, that is, the noise is patterned. As shown in FIGS. 2 and 5, the patterned data that are the coefficient data of peak 1 to the coefficient data of peak n are expressed as F(x) on the basis of the coefficients of the function F(x) obtained by the Lagrange interpolation method for convenience.

2-5. Process of Determining Whether Noise is Present

The pattern data F(x) output from the three dimensional correspondence patterning unit 13 are input to the noise determining unit 14, as shown in FIG. 2.

The noise determining unit 14 compares the pattern data F(x) to a reference pattern data P(x) maintained in the matching table 15. Subsequently, on the basis of the comparison result, the noise determining unit 14 determines whether a noise is present for each division frequency.

Here, the reference pattern data P(x) will be described.

The noise reducing apparatus according to this embodiment supposes that a removing target noise is present and the process of calculating and normalizing the above-described polynomial is performed for this noise (referred to as a supposed noise). Here, the quadratic polynomial (normalized quadratic polynomial) is calculated.

FIG. 11 is a diagram schematically illustrating a relationship between a frequency and a numerical value range of the coefficients a, b, and c of the normalized quadratic polynomial for the supposed noise obtained in the above-described way.

In FIG. 11, the vertical axis represents the coefficient values of the polynomial and the horizontal axis represents the frequency. From FIG. 11, it may be known that the numerical value range of the coefficients of the normalized quadratic polynomial for the supposed noise is determined depending on the frequency.

In this embodiment, the range of the coefficient pattern of the normalized quadratic polynomial for the supposed noise obtained in this way is used as a matching range. In FIG. 11, coefficients a and b and a coefficient ratio $-c/a$ between the coefficients a and c are defined as the matching range.

For example, instead of the coefficient ratio $-c/a$, a coefficient c may generally be defined as the matching range. In the normalized polynomial according to this embodiment, however, when the coefficient a is large, the coefficient c (intercept) has a tendency to increase. Therefore, the coefficient ratio $-c/a$ is defined, instead of the coefficient c. In this way, a variation in the coefficient is averaged, compared to the case where the coefficient c is simply determined as the matching range. As a consequence, since the change in the matching range is inhibited and the matching range can be made smaller, it can be expected to obtain a noise determination result more exactly.

The matching table 15 maintaining the reference pattern data P(x) becomes data (matching data) with a table format representing the matching range of the coefficient pattern of the coefficients a and b and the coefficient ratio $-c/a$ shown in FIG. 11. The detailed example of the matching table 15 is shown in FIG. 12. In effect, the data stored in the matching table are stored in a memory or the like, for example.

The matching table 15 shown in FIG. 12 is the data after the FFT process and it is assumed that the data shown in FIGS. 3B and 3C have been obtained. Moreover, for convenience, the frequency band (Nyquist frequency) of the signal after the FFT process is assumed to be 22.1 kHz.

In the matching table 15 shown in FIG. 12, data positions 1 to 512 after the FFT process are divided in accordance with each predetermined range. Here, the range is divided into the data positions 1 to 8, the data positions 9 to 40, the data positions 41 to 53, and the data positions 54 to 512. This means the frequency band 22.1 kHz (the Nyquist frequency of the source signal) of the data (frequency signal) after the FFT process is divided into four band ranges (division band ranges). In other words, 512 division frequencies corresponding to the data positions 1 to 512 are categorized into four groups in each of the division band ranges.

As for the real frequency range corresponding to each division band range, the data positions 1 to 8 is in the range from 43.1 Hz to 344.5 Hz, the data positions 9 to 40 is in the range from 387.6 Hz to 1.72 kHz, the data positions 41 to 53 is in the range from 1.77 kHz to 2.28 kHz, and the data positions 54 to 512 is in the range from 2.33 kHz to 22.1 kHz.

The upper limit and lower limit of each matching range for the coefficients a and b and the coefficient ratio $-c/a$ are shown for the three division band ranges from 43.1 Hz to 344.5 Hz, from 387.6 Hz to 1.72 kHz, and from 1.77 kHz to 2.28 kHz corresponding to the data positions 1 to 8, the data positions 9 to 40, and the data positions 41 to 53, respectively.

Effective upper limit and lower limit are not stored for the highest division band range from 2.33 kHz to 22.1 kHz corresponding to the data positions 54 to 512. This means that the supposed noise does not occur in the frequency band higher than about 2.3 kHz. In other words, the supposed noise occurs in the frequency band equal to or lower than about 2.3 kHz (2.28 kHz).

In this case, the data that are in effect contained in the matching table 15 are data of the matching ranges (the upper limit and the lower limit) corresponding to the data positions 1 to 8 (the division band frequency from 43.1 Hz to 344.5 Hz), the data positions 9 to 40 (the division band frequency from 387.6 Hz to 1.72 kHz), and the data positions 41 to 53 (the division band frequency from 1.77 kHz to 2.28 kHz). In this way, the matching table 15 may not necessarily have the data of the matching ranges in accordance with all of the division frequencies corresponding to the data after the FFT process. The matching table 15 may have the data of the matching ranges corresponding to only the division frequency of the frequency band ranges where the noise occurs. In this way, the data size necessary in effect in the matching table 15 can be reduced.

As described above, the matching table 15 may simply have the matching ranges for the coefficient c instead of the coefficient ratio $-c/a$. FIG. 12 shows the upper limit/lower limit of each matching range for the coefficient c in the frame indicated by a dash line.

A noise determining process performed by the noise determining unit 14 is performed in the following way, for example, to correspond to the case of the configuration of the matching table 15 shown in FIG. 12.

The noise determining unit 14 first inputs the coefficient data of peak 1 to the coefficient data of peak n corresponding to each band signal, where the peak is detected, as the pattern data F(x) from the three dimensional correspondence patterning unit 13. The data of the matching ranges (upper limit/lower limit) of the coefficients a and b and the coefficient ratio $-c/a$ (or the coefficient c) for the division frequencies (data positions) corresponding to the coefficient data of peak 1 to the coefficient data of peak n are input as the reference pattern data P(x) from the matching table 15.

Subsequently, the noise determining unit 14 performs the comparison process by determining whether the coefficients a and b and the coefficient ratio $-c/a$ represented by the coefficient data of peak 1 are contained in the matching range of the coefficients a and b and the coefficient ratio $-c/a$ corresponding to the same division frequency (data positions).

When all of the coefficients a and b and the coefficient ratio $-c/a$ represented by the coefficient data of peak 1 are contained in the matching range, the band signal based on the coefficient data of peak 1 is determined as noise. That is, the determination result of the presence of a noise is obtained. Alternatively, when at least one of the coefficients a and b and the coefficient ratio $-c/a$ represented by the coefficient data of peak 1 are not contained in the matching range, the determination result of the non-presence of a noise is obtained.

Likewise, it is determined whether a noise is present for the division frequency on the basis of whether all of the coefficients a and b and the coefficient ratio $-c/a$ represented by each of the coefficient data of peak 2 to the coefficient data of peak n are contained in the matching range.

In this way, in this embodiment, it is determined whether a noise is present for each division frequency.

A different method of determining whether a noise is present may be considered. For example, when a certain number or more of the coefficients represented by the coefficient data is contained in the matching range, it may be determined that a noise is present. Alternatively, an evaluation value corresponding to a distance for a reference value in the matching range may be calculated for the coefficient value represented by the coefficient data. On the basis of the evaluation value, it may be determined whether a noise is present.

The above-described three dimensional correspondence patterning unit 13 allows the peak detection section 21 to first perform the peak detection on the band signal of each division frequency, and then performs the polynomial calculation/normalization process on only the band signal where the peak is detected.

Figure 3:
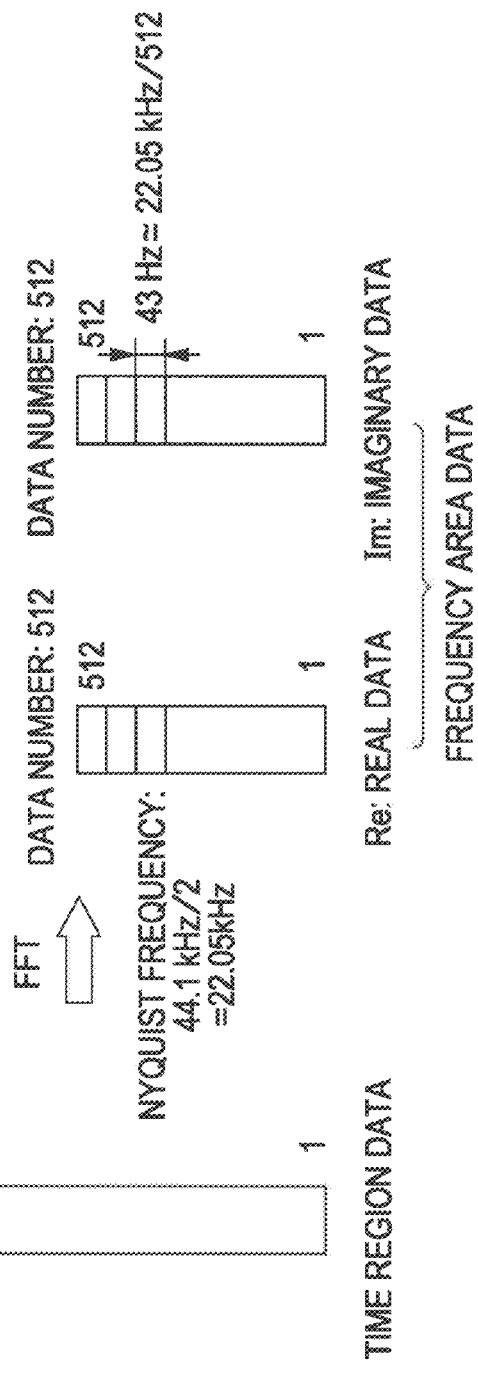
FIGS. 3A to 3C are diagrams schematically illustrating an example of an FFT process performed by an FFT unit according to the embodiment.

According to this embodiment, the peak detection section 21 may be omitted and the peak detection may not be carried out. In this case, each of the polynomial calculation/normalization sections 22-1 to 22-n is provided in each division frequency. In the example of FIG. 3, since the data number, that is, the number of division frequencies is 512, 512 polynomial calculation/normalization sections 22-1 to 22-512 are provided so as to correspond to the data number. When the frequency characteristics of a noise are restrictive to some bands of the entire frequency band obtained after the FFT process, as described with reference to FIG. 12, the polynomial calculation/normalization sections 22 may be provided so as to correspond to the division frequencies contained in the frequency band corresponding to the noise.

In this case, the polynomial calculation/normalization sections 22-1 to 22-n normally perform the polynomial calculation/normalization process on each of the samples of the input band signal and sequentially output the coefficient data. The coefficient data output in this way are contained in the matching range of the matching table 15, when the band signal is a noise. Alternatively, the coefficient data are not contained in the matching range, when the band signal is not a noise.

Then, the noise determining unit 14 compares the coefficient data of each division frequency (band signal), which is output as the pattern data F(x) normally from the three dimensional correspondence patterning unit 13, to the reference pattern data P(x) read from the matching table 15, that is, the matching range of each coefficient of each division frequency. As the comparison result, when each coefficient value represented by the coefficient data is contained in the matching range, for example, it is determined that a noise is present for the band signal. Alternatively, when each coefficient value is not contained in the matching range, it is determined that a noise is not present.

However, when the peak detection by the peak detection section 21 is omitted, it is necessary for the polynomial calculation/normalization sections 22-1 to 22-n to normally perform the polynomial calculation/normalization process. Moreover, it is necessary for the noise determining unit 14 to normally determine whether a noise is present. Accordingly, the processing amount may become considerable.

In this embodiment, the peak detection is carried out in the above-described way. The removing target "noise that irregularly occurs intermittently over time" in this embodiment increases and decreases relatively sharply, as described above. Therefore, the considerable peak is correspondingly obtained, when the noise occurs. This means that it may be considered that the noise does not occur when the peak is not detected. Accordingly, only when the peak is detected, the occurring noise is sufficiently detected just by performing the polynomial calculation/normalization process and the noise detecting process is present. Since it is not necessary to normally perform the polynomial calculation/normalization process and the noise detecting process, the processing amount becomes smaller. For example, a resource necessary for the processes can be reduced.

The noise determining unit 14 according to this embodiment can determine whether a noise is present. Moreover, the noise determining unit 14 can output information regarding the noise determination result and can output, as noise recognition information, the calculation result or the like acquired during the calculation of the noise determination result, as necessary.

3. Exemplary Configuration of Noise Recognition Processor (Second Example)

Figure 13:
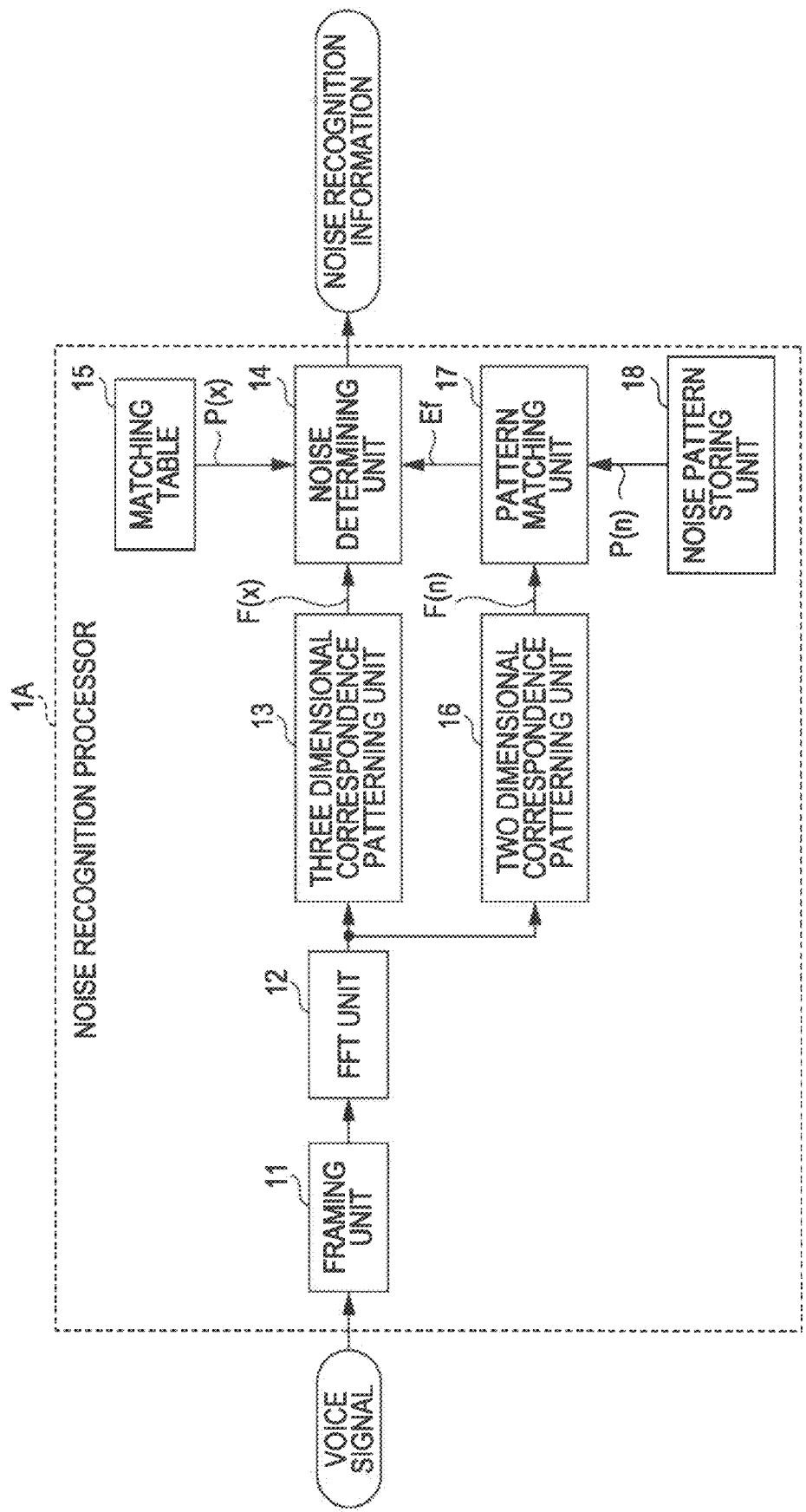
FIG. 13 is a block diagram illustrating an exemplary configuration of a noise recognition processor (second example) according to the embodiment.

FIG. 13 is a diagram illustrating a different exemplary configuration of the noise recognition processor (second example) according to the embodiment. In the drawing, the same reference numerals are given to the same elements as those in FIG. 2, and the description is omitted.

A noise recognition processor 1A shown in FIG. 13 further includes a two dimensional correspondence patterning unit 16, a pattern matching unit 17, and a noise pattern storing unit 18 in addition to the configuration shown in FIG. 2.

The two dimensional correspondence patterning unit 16 takes data (see FIGS. 3B and 3C) after the FFT process of the FFT unit 12 and maintains the data as a frequency signal F(n). Here, a voice signal is patterned in such a manner of maintaining and obtaining the frequency signal F(n) expressed by a frequency axis (F axis) and an amplitude (A axis) two-dimensionally.

The noise pattern storing unit 18 is a memory configured to maintain the noise pattern P(n). The data of the noise pattern P(n) can be obtained by modeling the frequency distribution of the supposed noise.

The pattern matching unit 17 performs a pattern matching process to obtain a correlation degree Ef between the frequency signal F(n) and the noise pattern P(n).

The correlation degree Ef can be obtained by the following calculation.

$$Ef = \frac{\sum_{n=1}^{N}\{F(n) \times P(n)\}}{\sqrt{\sum_{n=1}^{N}\{F(n)\}^2 \times \sum_{n=1}^{N}\{P(n)\}^2}} \quad \text{Equation 3}$$

In Equation 3, N is the number of FFT points (sample points) in one frame. That is, as the correlation between the noise pattern for the sample points of n=1 to N and the voice signal is higher, the correlation degree Ef becomes close to 1. That is, as the correlation degree Ef is close to 1, there is a high possibility that a noise is present.

In the configuration of FIG. 13, the value of the correlation degree Ef is taken by the noise determining unit 14.

Basically, as in the above description, the coefficient pattern of each band signal is compared to the matching range of the matching table 15 to determine whether a noise is present. In FIG. 13, the determination result is obtained using the matching table 15, and it is also determined whether the correlation degree EF is equal to or larger than a predetermined threshold value. That is, in the determination of the noise corresponding to one band signal, when the coefficient pattern of the band signal is contained in the matching range of the matching table 15 and also is in a frequency area where the correlation degree EF is equal to or larger than the threshold value, it is determined that a noise is present. Alternatively, when the coefficient pattern of the band signal is contained in the matching range of the matching table 15, but is in a frequency area where the correlation degree Ef is smaller than the threshold value, it is determined that a noise is not present. Accordingly, the noise determination result can be obtained more exactly.

4. Exemplary Configuration of Noise Reducing Apparatus (First Example)

4-1. Overall Configuration

Figure 14:
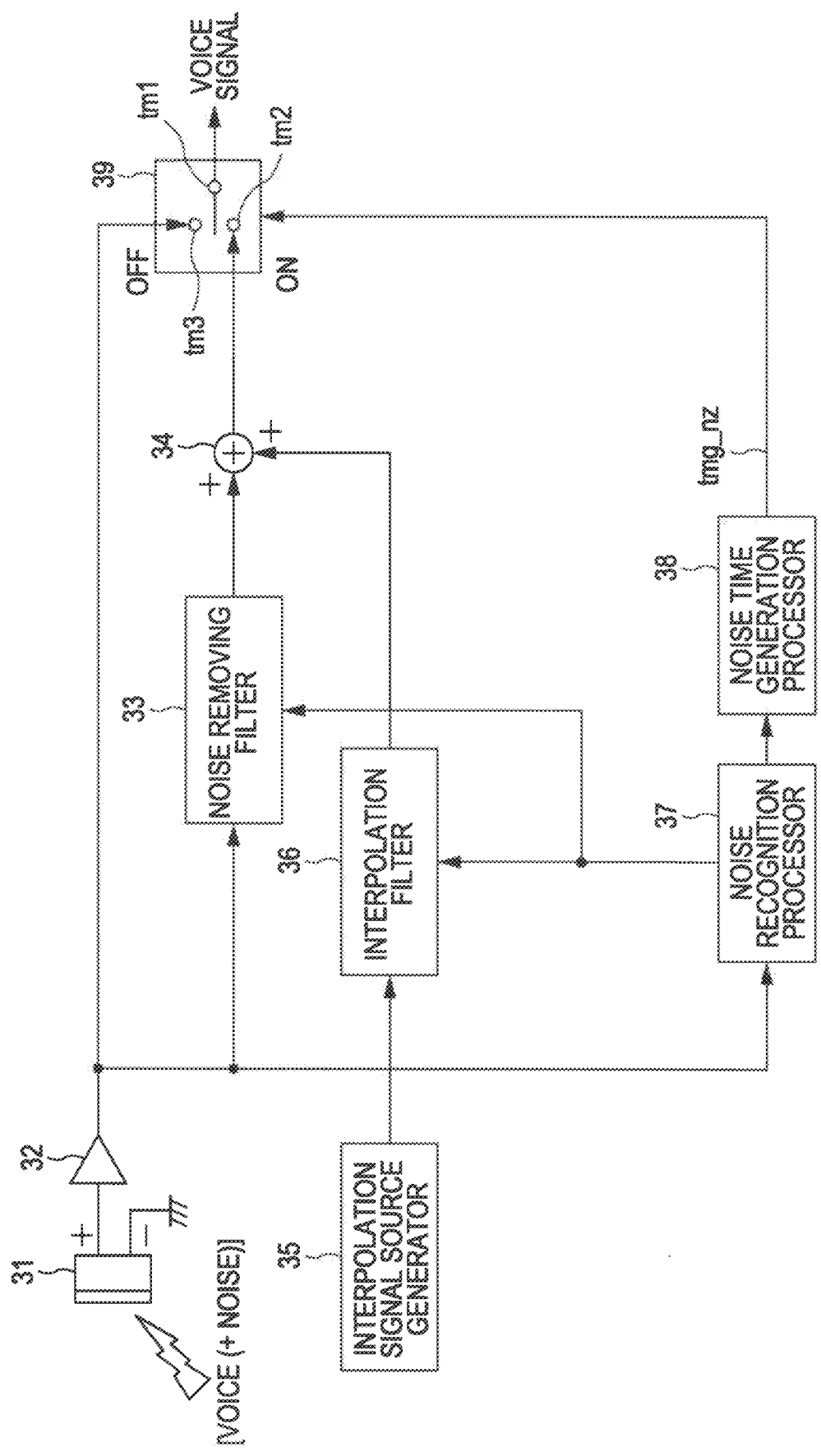
FIG. 14 is a block diagram illustrating an exemplary configuration of the noise reducing apparatus (first example) according to the embodiment.

FIG. 14 is a diagram illustrating a first example of the noise reducing apparatus including the noise recognition processor 1 as the first example or the noise recognition processor 1A as the second example according to the embodiment.

The noise reducing apparatus shown in FIG. 14 includes a microphone 31, an amplifier 32, a noise removing filter 33, an adder 34, an interpolation signal source generator 35, an interpolation filter 36, a noise recognition processor 37, a noise time generation processor 38, and a switch 39.

The microphone 31 is included in or connected to the outside of an electronic apparatus mounted in the noise reducing apparatus shown in the drawing. For example, when the electronic apparatus is a video camera, the microphone 31 is disposed so as to receive a recording voice. The microphone 31 receives a removing target noise in this embodiment and a voice that is originally received.

The voice input to the microphone 31 is converted into a voice signal and is amplified by the amplifier 32.

In this case, the digital voice signal (input voice signal) output from the amplifier 32 is supplied to a terminal tm3 of the switch 39, and then is diverted to be input to the noise removing filter 33 and the noise recognition processor 37.

The noise removing filter 33 is formed by a BEF (Band Elimination Filter) or the like. The noise removing filter 33 sets a frequency that has to be blocked (inhibited) in accordance with information (noise occurrence frequency instruction information) indicating the frequency (division frequency) where a noise output from the noise recognition processor 37 occurs. Therefore, the voice signal passing through the noise removing filter 33 is a voice from which the voice component of the frequency where the noise occurs is removed.

The adder 34 combines the voice signal output from the noise removing filter 33 and an interpolation signal output from the interpolation filter 36.

The voice signal is generated by the interpolation signal source generator 35 and the interpolation filter 36.

The interpolation signal source generator 35 generates a signal having the frequency characteristic of the frequency band (for example, 43.1 Hz to 2.28 kHz in the configuration of FIG. 12) considered as the noise in this embodiment.

Figure 16:
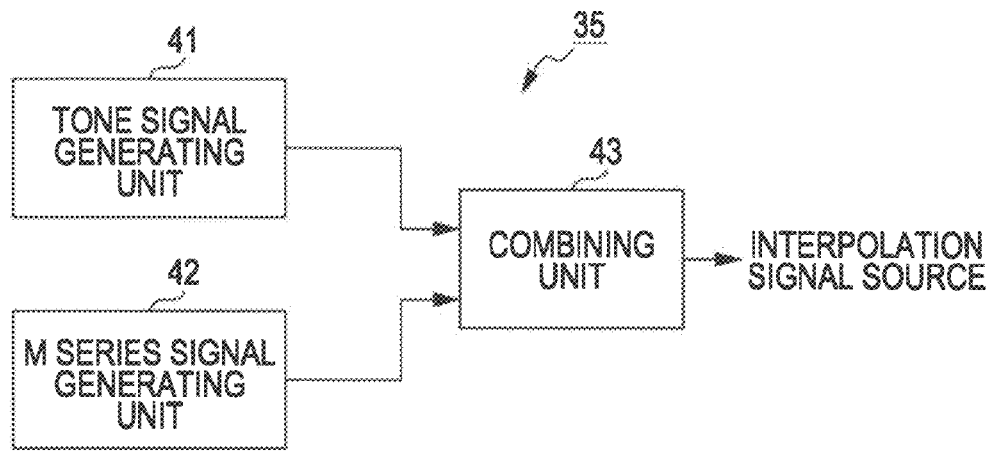
FIG. 16 is a block diagram illustrating an exemplary configuration of an interpolation signal source generator.

FIG. 16 is a diagram illustrating an exemplary configuration of the interpolation signal source generator 35.

The interpolation signal source generator 35 shown in FIG. 16 includes a tone signal generating unit 41, an M series signal generating unit 42, and a combining unit 43.

The tone signal generating unit 41 generates a tone signal by a single or plural sine waves or wave pulses over a period. The tone signal has a single peak or plural peaks at a predetermined frequency due to the frequency characteristic.

The M series signal generating unit 42 generates a so-called M series random signal of which a level is uniform at the entire bands. An example of this signal is a white noise.

The combining unit 43 combines and outputs the tone signal generated by the tone signal generating unit 41 and the M series signal generated by the M series signal generating unit 42 at a predetermined combination ratio. The combined signal output from the combining unit 43 serves as an interpolation signal source.

The combination ratio is not fixed, but may be changed adaptively, for example. For example, by analyzing the voice received from the microphone 31, an approximation ratio between the component of the tone signal and the M series signal is calculated. The combination ratio is varied on the basis of the approximation ratio. Accordingly, when the component of the tone signal is larger in the received voice, an interpolation signal source formed to be close to the component of the tone signal by component combination can be output. Alternatively, when the component of the M series signal is larger, an interpolation signal source formed to be close to the component of the M series signal by component combination can be output.

Depending on a case, the combination ratio may be set to be fixed so as to output only the tone signal or only the M series signal as the interpolation signal source.

The interpolation signal source output from the interpolation signal source generator 35 is output to the interpolation filter 36. The interpolation filter 36 is a filter configured to input the same noise occurrence frequency instruction information as that output from the noise removing filter 33 and to set an inverse filter characteristic to that of the noise removing filter 33. That is, a blocking band set in the noise removing filter 33 is set as a passing band in the interpolation filter 36. A passing band set in the noise removing filter 33 is set as a blocking band in the interpolation filter 36.

With such a configuration, the interpolation filter 36 outputs the interpolation signal source of which only the component of the band corresponding to the band blocked in the noise removing filter 33. The interpolation signal source is output as the interpolation signal to the adder 34.

The adder 34 combines the voice signal output from the noise removing filter 33 and the interpolation signal output from the interpolation filter 36 to output the combined signal to a terminal tm2 of the switch 39.

The noise recognition processor 37 has the configuration of the noise recognition processor 1 shown in FIG. 2 or the configuration of the noise recognition processor 1A shown in FIG. 13, as described above. In the noise recognition processors 1 and 1A as the noise recognition processor 37, the input voice signal input by the framing unit 11 serves as the digital voice signal obtained by the microphone 31 and the amplifier 32. In addition, in the noise recognition processors 1 and 1A as the noise recognition processor 37, the noise removing filter 33 and the interpolation filter 36 output the noise occurrence frequency instruction information as the noise recognition information.

The noise time generation processor 38 performs a process of determining the period (noise occurrence generation period) during which a noise occurs, when the noise recognition processor 37 determines that the noise is present in a certain band signal (division frequency). An example of the process of determining the noise occurrence period is described below.

The noise time generation processor 38 outputs a noise time signal tmg_ng to the switch 39 to instruct timing of the noise occurrence period on the basis of the determination result.

The switch 39 connects the terminal tm1 to the terminal tm3 to directly output the input voice signal output from the amplifier 32 for a period during which no noise time signal tmg_ng is output, that is, for a period (noise non-occurrence period) during which no noise occurs.

On the contrary, for a period during which the noise time signal tmg_ng is output, that is, a period during which a noise occurs, the switch 39 connects the terminal tm1 to the terminal tm2 to output the voice signal output from the adder 34, that is, the voice signal subjected to a noise removal interpolation process.

For example, when the noise reducing apparatus according to this embodiment is mounted in an apparatus capable of carrying out recording, the voice signal output from the switch 39, that is, the voice signal output from the noise reducing apparatus is recorded.

Figure 18A:
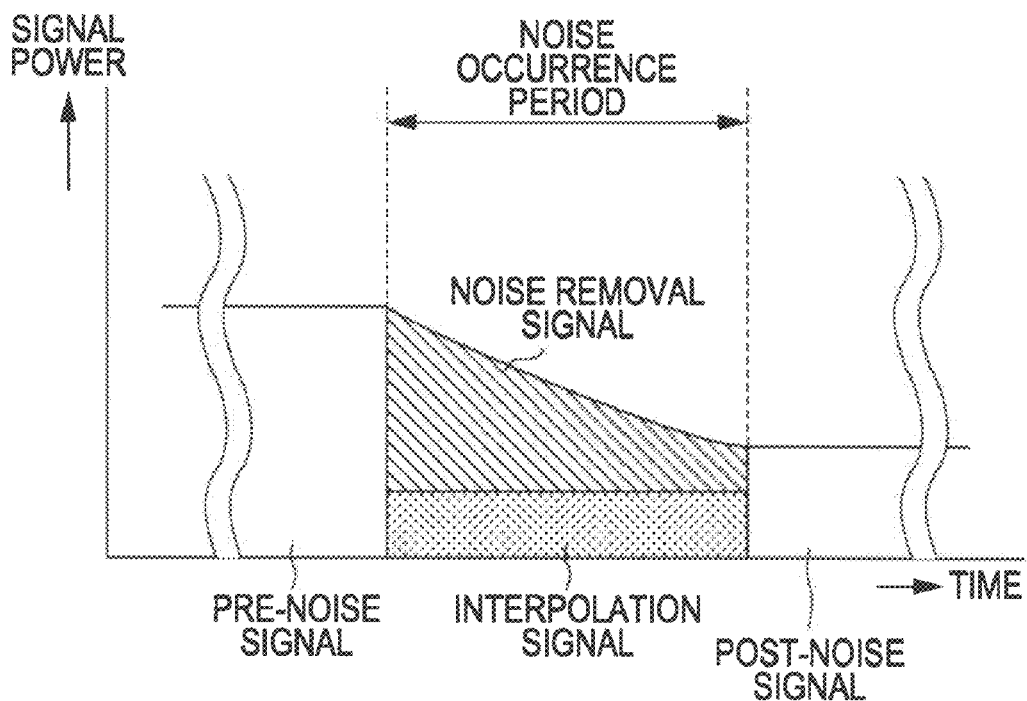
FIGS. 18A and 18B are diagrams schematically illustrating examples of switch time between a voice signal subjected to noise removing interpolation and an input voice signal.

FIG. 18A is a diagram schematically illustrating the voice signal output over time from the terminal tm1 of the switch 39. In FIG. 18A, the horizontal axis represents time and the vertical axis represents the power of the voice signal.

In FIG. 18A, the noise occurrence period corresponds to a period during which the noise time signal tmg_ng is output.

The voice signal (input voice signal) input directly from the amplifier 32 is output from the switch 39 for a period before the noise occurrence period. That is, the voice signal which is not subjected to the noise removal interpolation process is output. Here, the voice signal which is output for the period before the noise occurrence period and is not subjected to the noise removal interpolation process is referred to as a pre-voice signal.

Subsequently, when the output of the noise time signal tmg_ng is initialized and thus the noise occurrence period is initialized, the output of the voice signal which is not subjected to the noise removal interpolation process is terminated. Instead, the signal output from the adder 34, that is, the output of the voice signal subjected to the noise removal interpolation process is initialized.

When the output of the noise time signal tmg_ng stops and thus the noise occurrence period is terminated, the switch 39 switches the output of the voice signal (the voice signal subjected to the noise removal interpolation process) from the adder 34 to the output of the voice signal (the voice signal which is not subjected to the noise removal interpolation process) from the amplifier 32. The voice signal which is output for a period after the noise occurrence period and is not subjected to the noise removal interpolation process is referred to as a post-voice signal.

The voice signal which is output from the switch 39 for the noise occurrence period and is subjected to the noise removal interpolation process can be considered to be formed by combining the noise removal signal and the interpolation signal in the way schematically illustrated in FIG. 18A.

Here, the noise removal signal is the voice signal output from the noise removing filter 33. That is, the noise removal signal is the voice signal formed by removing the component of the division frequency band, where a noise occurs, from the source voice signal by the noise removing filter 33. The signal power of the noise removal signal becomes lower than that of the source voice signal by a degree of removing the band where the noise occurs. However, the interpolation signal is the voice signal formed of the frequency band removed from the source voice signal. Therefore, by combining the interpolation signal by the adder 34, the voice signal output from the switch 39 and subjected to the noise removing process has the same signal power as that of the source voice signal. FIG. 18A shows that the envelope of the voice signal for the noise occurrence period is connected to the envelope of a pre-signal and a post-signal. Therefore, the signal power (level) of the voice signal subjected to the noise removing process is the same as that of the source voice signal.

In this embodiment, the component of the entire frequency bands of the source voice signal is not removed for the noise occurrence period (which is also a noise removal period during which a noise is removed).

For example, in order to perform the noise removal and the interpolation, the noise is first removed by removing the component of the entire frequency bands of the source voice signal for the noise occurrence period. Alternatively, the voice signal subjected to the noise removing process may be combined with the interpolation signal with the entire frequency bands of the source voice signal to generate the voice signal subjected to the noise removal interpolation processes. In this case, however, the voice signal may be unnatural in terms of acoustic sense, in that the voice signal is easily turned to the interpolation signal in the entire bands for the noise occurrence period.

In this embodiment, however, according to the processes of the noise removing filter 33 and the interpolation filter 36 described above, the noise is removed by removing only the band of the division frequency determined to have a noise from the source voice signal for the noise occurrence (removal) period. In other words, the frequency band where no noise occurs remains in the source voice signal. Subsequently, only the component of the voice signal of which the band is removed in the noise removal is supplemented by combining the interpolation signal. In this way, it is possible to improve continuity of the voice for the noise occurrence period and the previous and next voice periods. Accordingly, a masking effect can be achieved more effectively, thereby obtaining a natural voice in terms of acoustic sense where the source voice is not damaged.

Figure 18B:
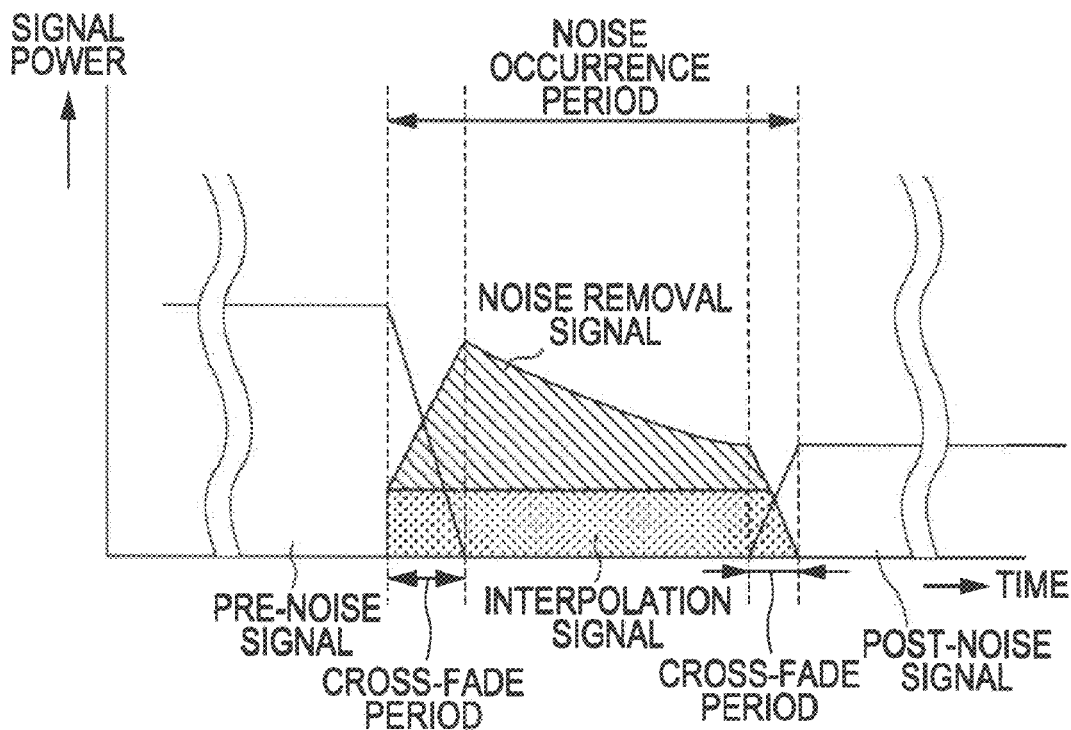

FIG. 18B is a diagram illustrating another example of the combination in the time axis direction between a source voice signal (the voice signal output from the amplifier 32) as a pre-signal and a post-signal and a noise removal/interpolation signal (the voice signal output from the adder 34).

In FIG. 18A, a pre-signal is instantaneously switched to the noise removal/interpolation signal at the start point of the noise occurrence period. Likewise, the noise removal/interpolation signal is instantaneously switched to a post-signal. In the signal switch, the component of the source voice signal as the pre-signal is instantaneously switched to the interpolation signal in the band where the noise is removed, for example. In addition, the interpolation signal is instantaneously switched to the source voice signal as the post-signal. Therefore, harmonics may occur at the switching time, for example, and thus the voice may be heard unnaturally.

Accordingly, in FIG. 18B, there is provided a period (cross-fade period) during which a cross-fade process is performed to decrease the pre-signal gradually and to increase the noise removal/interpolation signal gradually up to the source level thereof for a certain period from the start point of the noise occurrence period. Likewise, there is provided a cross-fade period during which the post-signal is gradually increased up to the source level thereof and the noise removal/interpolation signal is gradually decreased for a certain period to the end point of the noise occurrence period.

In this way, by performing the cross-fade process on the source voice signal and the noise removal/interpolation signal for a certain period at the start point and the end point of the noise occurrence period, it is possible to inhibit the occurrence of the harmonics considerably and to avoid a ringing phenomenon, an overshot phenomenon, or the like. Accordingly, a more natural voice in terms of acoustic sense can be obtained.

The level variation in the voice signal for the cross-fade period can be realized by providing a cross-fade switch in the switch 39. The cross-fade switch combines and outputs two input voice signals, for example, via attenuators of which the control coefficients are variable. A control coefficient c is a value of the range from 0 to 1, for example. The attenuator outputs the voice signal with a level of a source signal level× C.

Subsequently, for the cross-fade period, a control coefficient $c_1$ of one attenuator is varied to be increased to the range from 0 to 1 over time, and then a control coefficient $c_2$ of the other attenuator is varied so as to satisfy a relation of $c_2=1-c_1$.

The cross-fade period may be decided on the basis of the noise time signal tmg_ng. For example, the noise time signal tmg_ng has the detail used to instruct the start/end time points of the noise occurrence period. For example, the switch 39 serving as the cross-fade switch performs all of the cross-fade processes for a certain period from the start time point of the noise occurrence period. Moreover, a specific time going back from the end time point of the noise occurrence period by the cross-fade period is determined, and the final cross-fade process is performed from the specific time to the end time point of the noise occurrence period.

For example, only the signal subjected to the noise removal interpolation process, that is, only the voice signal output from the adder 34 may normally be output from the noise reducing apparatus. However, the voice signal output from the adder 34 deteriorates, compared to the input voice signal, in that the voice signal output from the adder 34 is output via the processing system configured to perform the noise removal interpolation process. In the noise reducing apparatus according to this embodiment, however, the input voice signal from the switch 39 is output without change to output the high-quality voice signal.

4-2. Process of Determining Noise Occurrence Period

Next, the process of determining the noise occurrence time, which is performed by the noise time generation processor 38 in FIG. 14, will be described with reference to FIG. 19. In the description of the drawing, the quadratic polynomial is used in the polynomial calculation.

The noise time generation processor 38 performs the process of determining the noise occurrence period, when the noise recognition processor 37 (the noise recognition processor 1 or 1A) determines that a noise is present at a certain band signal (division frequency).

For example, when the noise recognition processor 37 determines that a noise is present, the noise recognition processor 37 sends the coefficient data of the division frequency where the noise is present, for example, as the noise recognition information, to the noise time generation processor 38.

Figure 19:
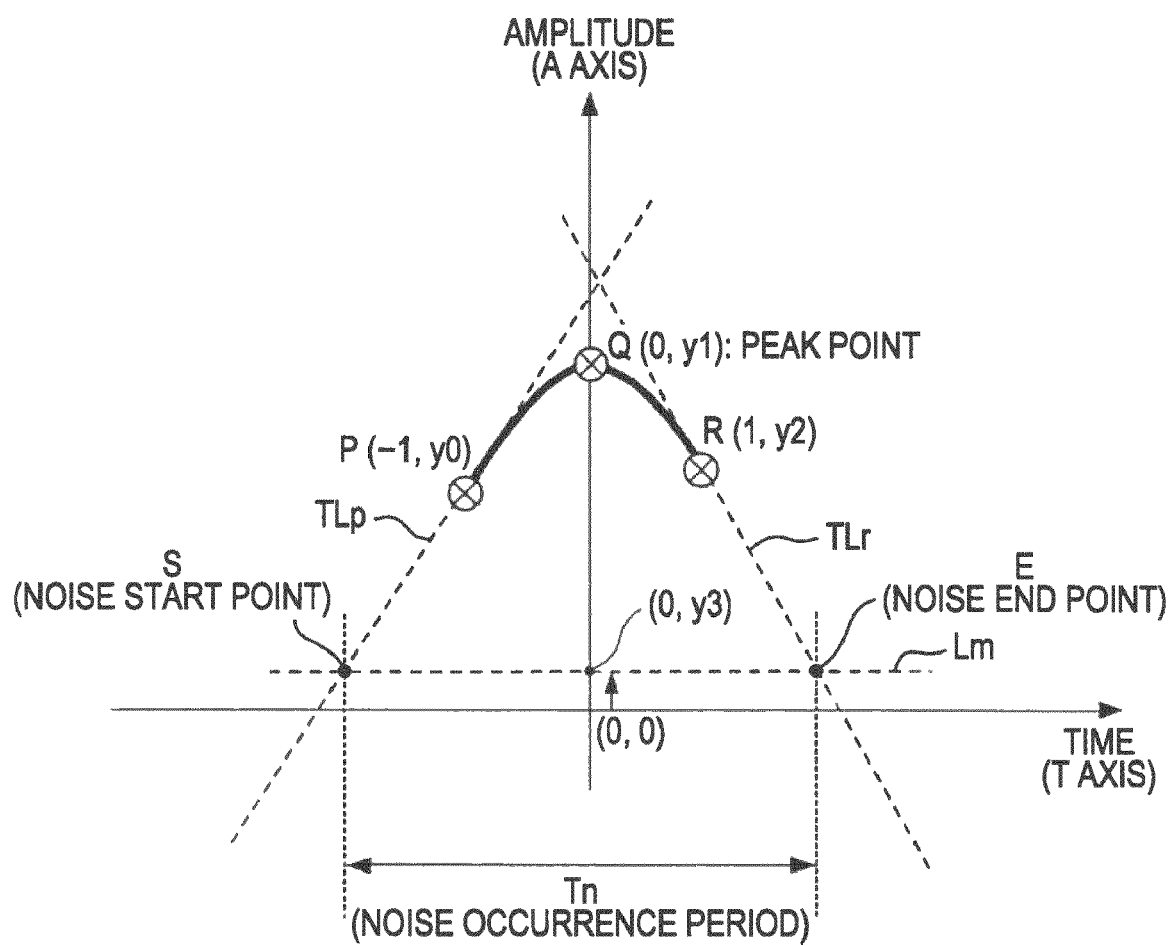
FIG. 19 is a diagram schematically illustrating an example of a process of calculating a noise occurrence period.

The noise time generation processor 38 calculates coordinates P, Q, and R shown in FIG. 19, on the basis of the quadratic polynomial which is acquired in the above-described way and is represented by the coefficients of the division frequency where the noise is present. In FIG. 19, the horizontal axis and the vertical axis (A axis) of the coordinate axis represent time and the absolute value amplitude Va, respectively. The time at which the quadratic polynomial becomes the maximum value is set to 0 on the horizontal time axis.

The coordinate Q (0, $y_1$) is a coordinate of the maximum value of the curve of the quadratic polynomial represented by the coefficient data. The coordinate P ($-1$, $y_0$) is an arbitrary coordinate located at the front of the coordinate Q at time in the curve of the quadratic polynomial. The coordinate R (1, $y_2$) is an arbitrary coordinate located at the rear of the coordinate Q at time in the curve of the quadratic polynomial. Here, the coordinate value of the coordinate P on the time axis in the curve is $-1$. In addition, the coordinate value of the coordinate R on the time axis in the curve is 1.

Subsequently, tangent lines of the curve of the quadratic polynomial, that is, a tangent line TLp passing through the coordinate P ($-1$, $y_0$) and a tangent line TLr passing through the coordinate R (1, $y_2$) are calculated. The tangent lines TLp and TLr can be expressed by a linear function.

A threshold value line Lm is set for the coordinates. The threshold value line Lm is a straight line that is expressed as $x=y_3$ and is parallel to the time axis. In this case, a threshold value $y_3$ is a value calculated by an expression $y_3=y_1*a$ (where $a<1$) at the maximum value $y_1$. That is, the threshold value $y_3$ is calculated as a value smaller by a certain ratio with respect to the maximum value. Specifically, the threshold value $y_3$ may be set to a value smaller by about 10% (where $a=0.1$) of the maximum value $y_1$.

Subsequently, the coordinates of the intersection point of the threshold value line Lm and the tangent line TLp are calculated. In this embodiment, time corresponding to the x coordinate of the intersection point in effect is set to the start time of the noise occurrence, that is, a noise start point S.

Likewise, the coordinates of the intersection point of the threshold value line Lm and the tangent line TLr are calculated. Time corresponding to the x coordinate of the intersection point in effect is set to the end time of the noise occurrence, that is, a noise end point E.

That is, the period from the time of the noise start point S to the time of the noise end point E is the detected noise occurrence period Tn, as illustrated in the drawing.

The noise time generation processor 38 detects the noise occurrence period for each band signal (division frequency) where a noise is present.

The noise occurrence period is detected (determined) by using the polynomial obtained with the sampling points of the band signal. As the band signal is expressed as the polynomial, as described above, the band signal waveform closer to the more true waveform can be obtained. In this way, it is possible to perform the noise determining process on each division frequency with high precision. The noise occurrence period can be calculated on the basis of the same polynomial. Therefore, the start and end times of the noise occurrence period can be detected with higher precision.

Subsequently, the noise time generation processor 38 generates the noise time signal tmg_ng on the basis of the noise occurrence period determined at each division frequency in the above-described way.

For example, the noise time signal tmg_ng is obtained by calculating a logical sum of the noise occurrence period determined at each division frequency and by setting the output of the logical sum to the noise time signal tmg_ng. In this case, the noise time signal tmg_ng is obtained as a signal which becomes an H level at a period during which a noise occurs at least one division frequency and becomes an L level in a case where there is no division frequency at which a noise occurs. When the noise time signal tmg_ng is on the H level, the switch 39 connects the terminal tm2 to the terminal tm1 to output the voice signal (the voice signal output from the adder 34) subjected to the noise removing process. Alternatively, when the noise time signal tmg_ng is on the L level, the switch 39 connects the terminal tm3 to the terminal tm1 to output the voice signal (the voice signal output from the amplifier 32) which is not subjected to the noise removing process.

5. Exemplary Configuration of Noise Reducing Apparatus (Second Example)

Figure 15:
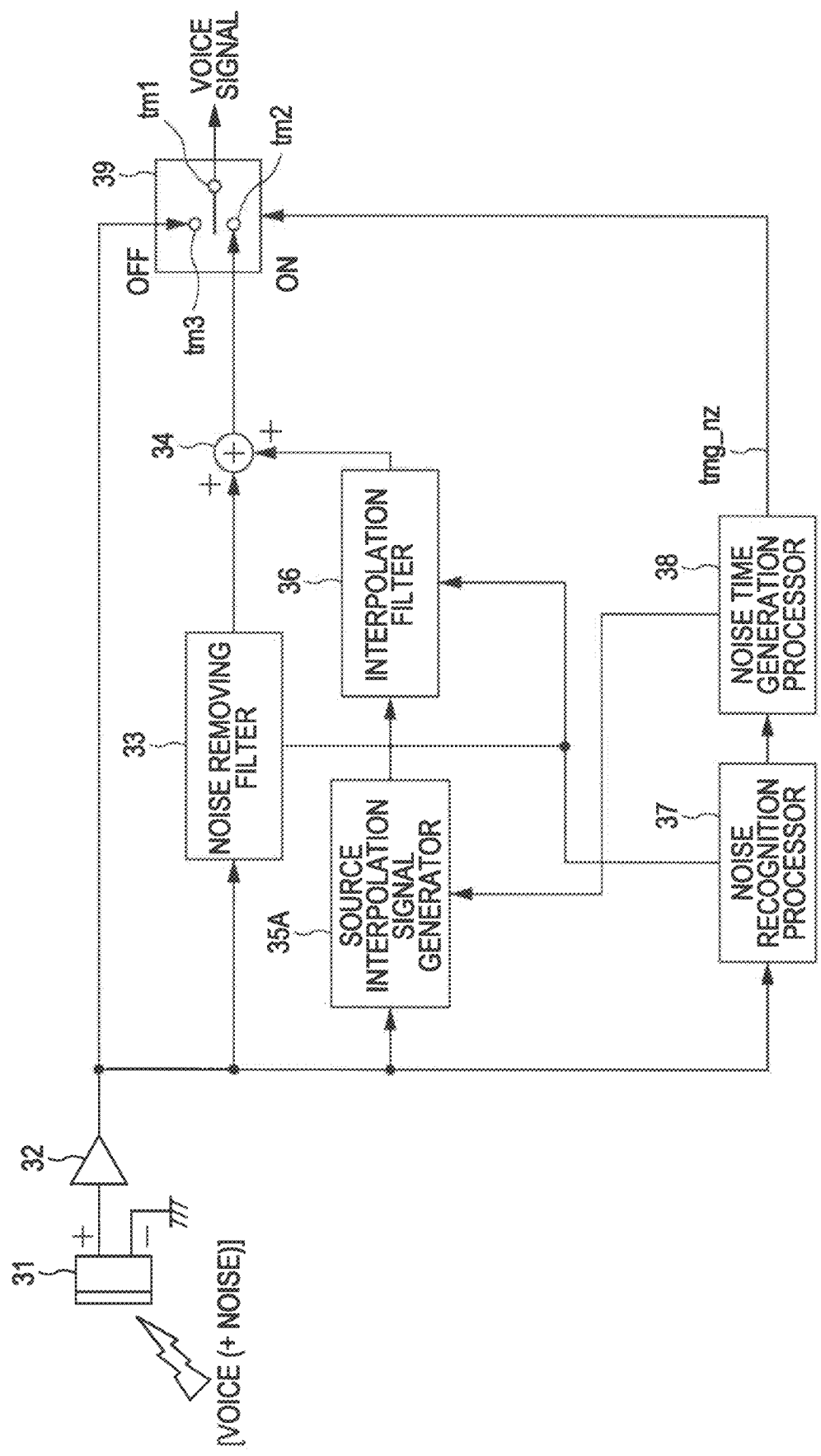
FIG. 15 is a block diagram illustrating an exemplary configuration of the noise reducing apparatus (second example) according to the embodiment.

FIG. 15 is a diagram illustrating a second example of the noise reducing apparatus according to this embodiment. In the drawing, the same reference numerals are given to the same elements as those in FIG. 14, and the description is omitted.

In FIG. 15, a source interpolation signal generator 35A is provided instead of the interpolation signal source generator 35 shown in FIG. 14.

The source voice signal is input from the amplifier 32 to the interpolation signal source generator 35. The noise recognition information is input from the noise time generation processor 38.

The interpolation signal source generator 35 in FIG. 14 independently generates the interpolation signal source, that is, the base signal of the interpolation signal. However, the source interpolation signal generator 35A in FIG. 15 generates a base voice signal of the interpolation signal on the basis of the voice signal (input voice signal) input from the amplifier 32. The voice signal generated by the source interpolation signal generator 35A is referred to as a source interpolation signal and is generated by the interpolation signal source generator 35 shown in FIG. 14. For example, the source interpolation signal is distinguished from the interpolation signal source which is white noise or the like.

The process of generating the source interpolation signal by the source interpolation signal generator 35A will be described with reference to FIG. 17.

Figure 17:
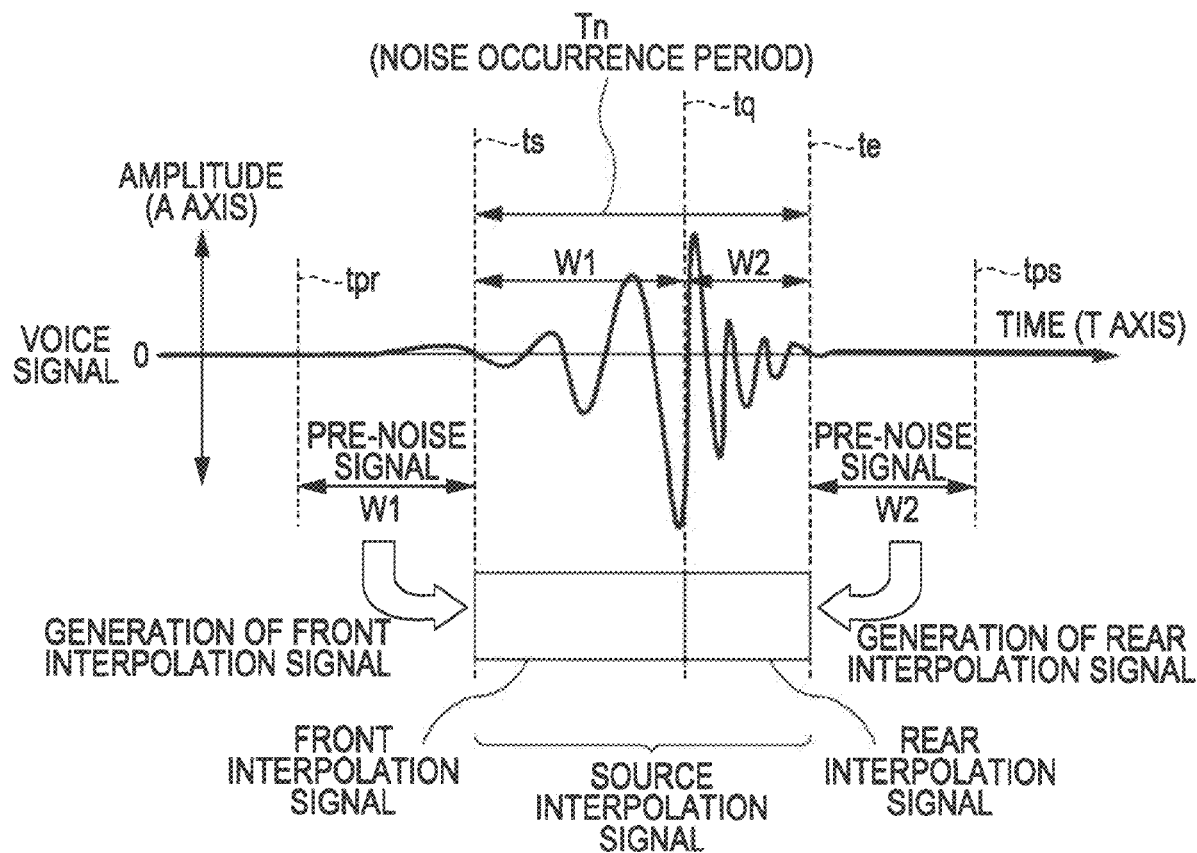
FIG. 17 is a diagram schematically illustrating an example of an interpolation signal generating process in the noise reducing apparatus serving as a second example.

FIG. 17 shows the waveform of the source voice signal. In this waveform, the horizontal axis represents time (T axis) and the vertical axis represents amplitude (A axis).

The source interpolation signal generator 35A inputs, as the noise recognition information from the noise time generation processor 38, for example, a signal indicating time ts and time te of the noise occurrence period and a signal indicating time (peak time tq) at which the voice signal (that is, a noise) becomes peak during the noise occurrence period.

For example, the signal indicating time ts and time te of the noise occurrence period is the same as the noise time signal tmg_ng output from the noise time generation processor 38 to the switch 39. For example, the signal indicating peak time tq can be obtained from the noise recognition information (the coefficient of the normalized polynomial) input from the noise recognition processor 37. In this way, the source interpolation signal generator 35A can recognize start time ts and end time te indicating the start and end of noise occurrence in the voice signal and can also recognize peak time tq at which the amplitude of the noise occurring in the voice signal becomes peak.

Here, time ts and te of the noise occurrence period indicated by the noise time signal tmg_ng corresponds to the logical sum of the noise occurrence period of one or more division frequencies, as described above. Accordingly, in the voice signal shown in FIG. 17, the noise occurs from time ts and to time te during the noise occurrence period, whereas no noise occurs before time ts and after time te.

As shown in FIG. 17, the source interpolation signal generator 35A generates a front interpolation signal and a rear interpolation signal and connects the front interpolation signal to the rear interpolation signal to generate the source interpolation signal.

The source interpolation signal generator 35A first performs a process of generating the front interpolation signal to calculate a time duration (time length) W1 from start time ts to peak time tq in the noise occurrence period. Subsequently, time tpr going back from start time ts by the time duration W1 is calculated. A voice signal in the interval from time tpr to time ts, that is, a voice signal (a pre-noise signal) in the interval of the time duration W1 immediately before start time ts is acquired as the front interpolation signal.

Moreover, the source interpolation signal generator 35A performs a process of generating the rear interpolation signal to calculate a time duration W2 from peak time tq to end time te in the noise occurrence period. Subsequently, time tps advancing from end time te over the time duration W2 is calculated. A voice signal in the interval from time te to time tps, that is, a voice signal (a post-noise signal) in the interval of the time duration W2 immediately after end time te is acquired as the rear interpolation signal.

Subsequently, the source interpolation signal generator 35A connects the front interpolation signal and the rear interpolation signal generated in this way so that the front interpolation signal is located before the rear interpolation signal over time. The voice signal connected in this way has a time length corresponding to the noise occurrence period, as shown in FIG. 17. The voice signal serves as the source interpolation signal.

The interpolation filter 36 inputs the source interpolation signal generated by the source interpolation signal generator 35A. As in the first example, the interpolation filter 36 passes only the component of the band corresponding to the band blocked by the noise removing filter 33 on the basis of the same noise occurrence frequency instruction information as that output to the noise removing filter 33, and then outputs the components of the band as the interpolation signal to the adder 34.

Even in this case, the voice signal output from the adder 34 is generated by blocking only the component of the division frequency where a noise occurs to remove the noise component by the noise removing filter 33 and by supplementing the frequency omitted by the noise removing filter 33 with the interpolation signal by the adder 34. That is, the voice signal subjected to the noise removal interpolation process is obtained.

In the second example, as shown in FIG. 17, the interpolation signal (source interpolation signal) is generated by using the voice signal intervals immediately before and after the noise occurrence period. The voice signal intervals immediately before and after the noise occurrence period is a voice signal in which no noise occurs in any band. Moreover, since the voice signal is the voice signal intervals immediately before and after the noise occurrence interval, the voice signal is strongly associated and continuous with a voice other than the noise occurring during the noise occurrence interval.

That is, in this embodiment, the voice signal in which a noise does not occur and the voice contents have high continuity with the voice contents of the noise occurrence interval is used as the interpolation signal. Accordingly, the voice subjected to the noise removing process can be expected to be more natural in terms of acoustic sense.

The source interpolation signal generating performed by the source interpolation signal generator 35A can be simplified by generating the source interpolation signal with only the pre-noise signal or with only the post-noise signal. This process is the same as the source interpolation signal generating process shown in FIG. 22, which is described below.

However, the voice contents of the voice signal may be changed before the noise occurrence and after the noise occurrence. For example, the voice contents may easily be changed in the boundary of the peak of the occurring noise. Therefore, when the natural voice in terms of acoustic sense is preferred, it is preferable that the front interpolation signal and the rear interpolation signal are generated and the connection points of the front interpolation signal and the rear interpolation signal are set to the time corresponding to the peak of the noise in the noise occurrence period, as illustrated in FIG. 17.

As a modified example of the case of generating the source interpolation signal with the front interpolation signal and the rear interpolation signal, a method may be considered such that the front interpolation signal is simply connected to the rear interpolation signal at a predetermined boundary time point, such as a middle time point of the noise occurrence period.

6. Exemplary Configuration of Noise Reducing Apparatus (Third Example)

6-1. Exemplary Overall Configuration

Next, third and fourth examples of the noise reducing apparatus according to this embodiment will be described. In the third and fourth examples, an interpolation signal generating process performed on the basis of a pitch period is applied, as described below.

Figure 20:
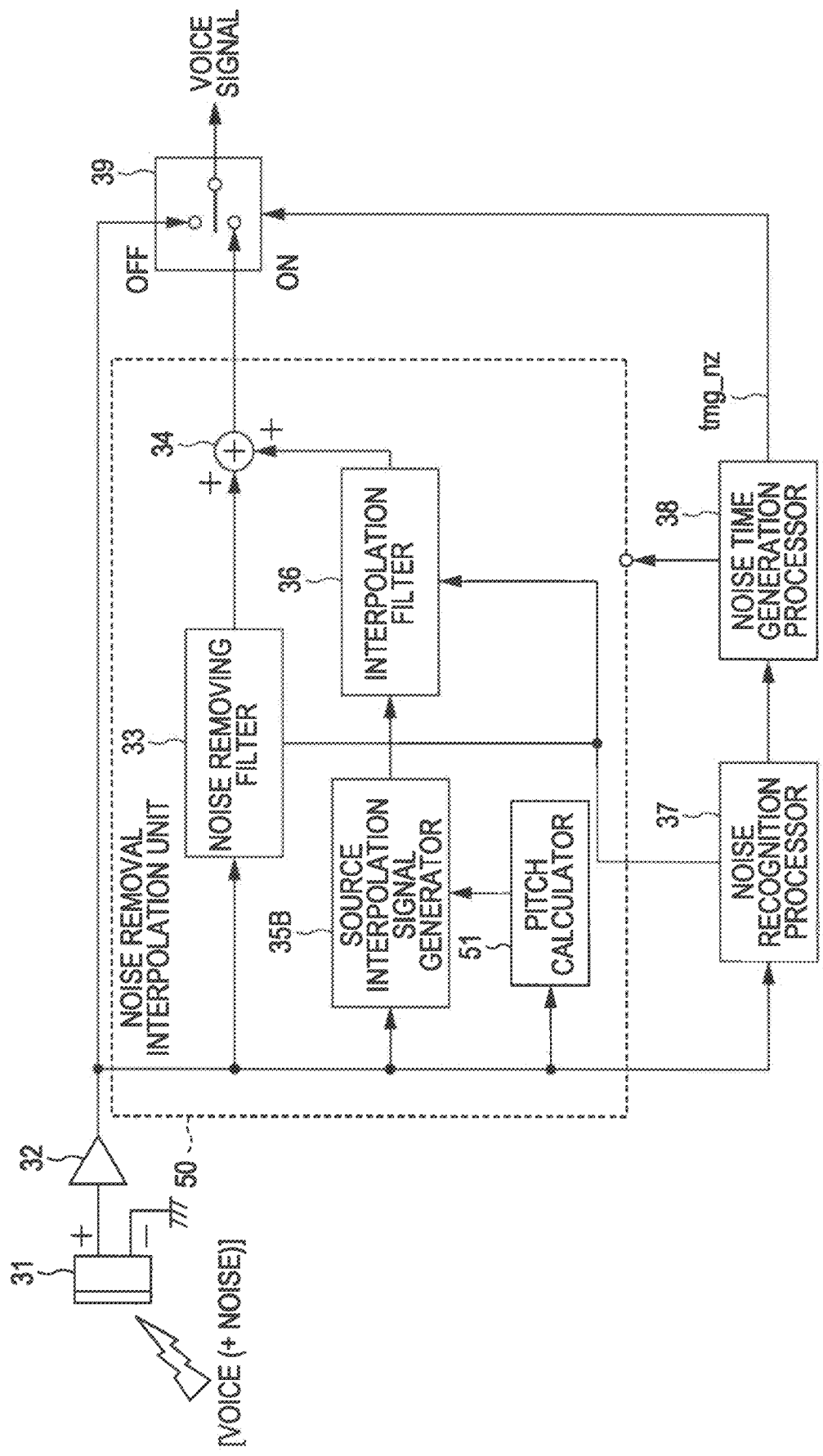
FIG. 20 is a block diagram illustrating an exemplary configuration of the noise reducing apparatus (third example) according to the embodiment.

FIG. 20 is a diagram illustrating an exemplary configuration of the noise reducing apparatus as the third example according to this embodiment. In the configuration shown in FIG. 20, the interpolation signal generating process performed in the noise reducing apparatus as the second example shown in FIG. 15 is configured on the basis of the pitch period. In FIG. 20, the same reference numerals are given to the same elements as those in FIG. 15, and the description is omitted.

In the configuration shown in FIG. 20, a pitch calculator 51 is added to the configuration shown in FIG. 15. Here, instead of the source interpolation signal generator 35A shown in FIG. 15, there is provided a source interpolation signal generator 35B which performs an interpolation signal generating process (pitch correspondence interpolation signal generating process) on the basis of a pitch of the input voice signal (use voice signal) to generate a source interpolation signal.

In FIG. 20, a noise removal interpolation unit 50 includes the noise removing filter 33, the adder 34, the interpolation signal source generator 35, the source interpolation signal generator 35B, the interpolation filter 36, and the pitch calculator 51. The noise recognition information is output from the noise time generation processor 38 to the noise removal interpolation unit 50.

The pitch calculator 51 inputs the input voice signal from the amplifier 32 to calculate a pitch. Here, the pitch refers to a period time corresponding to a basic frequency of the voice signal.

There are various methods of calculating the pitch. Here, an AMDF (Average Magnitude Difference Function) will be described simply, for example. The AMDF just performs calculation processes of addition and subtraction. However, an extraction precision of the pitch is relatively high, even though the AMDF is simpler than autocorrelation or FFT and performs a process simply.

The pitch by the AMDF is calculated by Equation 4.

$$D(m) = (1/N) \cdot \sum_{n=1}^{N} |X(n) - X(n-m)| \qquad \text{Equation 4}$$

In Equation 4, X represent an input signal taken by time windows of time 1 to N and D(m) represents the total sum of differences in a time difference m of the input signal X. The minimum value m of D(m) is calculated as the pitch. The case where the value of D(m) becomes the minimum value refers to a case where the phase difference of two signals x is 360°, that is, a time difference of one period occurs and thus the same waveforms overlap each other.

Information regarding the pitch calculated in this way is input by the source interpolation signal generator 35B and is used to generate the source interpolation signal.

The source interpolation signal generated by the source interpolation signal generator 35B is a voice signal having a frequency band corresponding to the input voice signal. As in the noise reducing apparatuses of the first and second examples, the interpolation filter 36 sets the filter characteristic, which is presented by the noise recognition information input from the noise recognition processor 37 and passes only the frequency where a noise occurs, and passes the source interpolation signal. In this way, the interpolation signal having the band characteristic of only the frequency where a noise occurs is obtained and input to the adder 34.

The adder 34 combines the voice signal from the noise removing filter 33 and the interpolation signal to output the combined signal as the voice signal subjected to the noise removal interpolation process.

6-2. Interpolation Signal Generating Process Based on Pitch (First Example)

Next, the interpolation signal generating process (the pitch correspondence interpolation signal generating process), which is performed in the noise reducing apparatus of the third example shown in FIG. 20 on the basis of the pitch of the input voice signal (use voice signal), will be described. First to third examples of the pitch correspondence interpolation signal generating process will be described.

Figure 22:
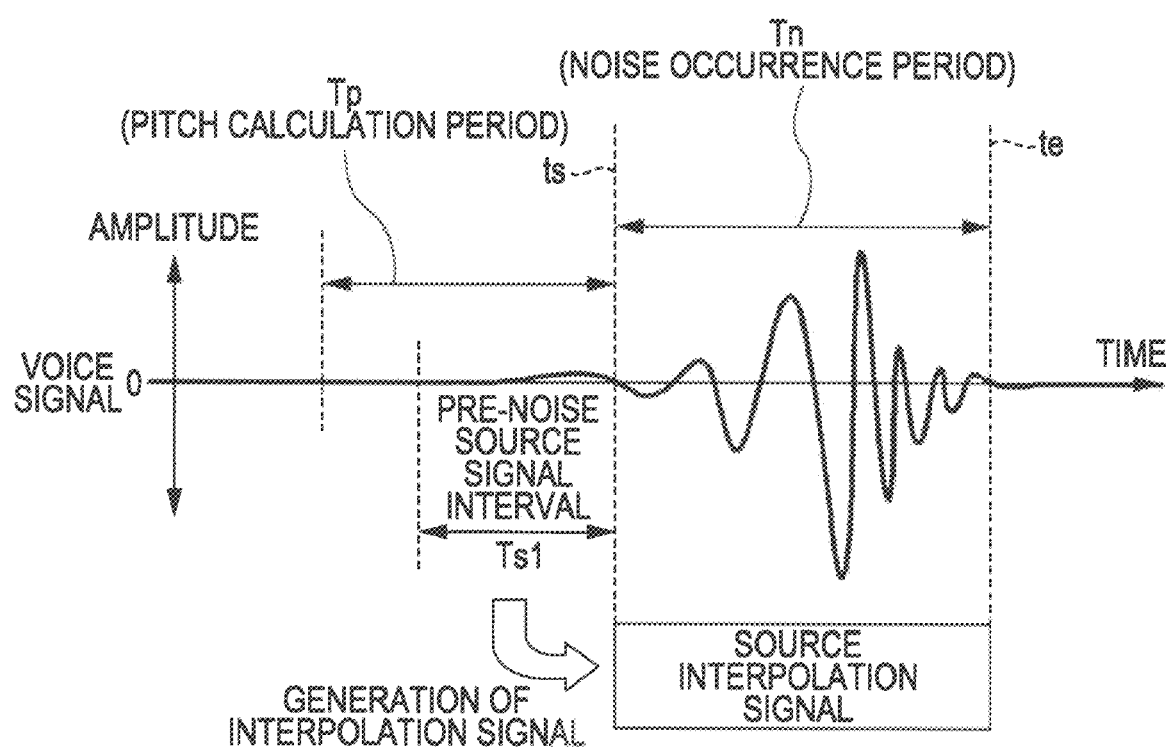
FIG. 22 is a diagram schematically illustrating the flow of pitch calculation and generation of a source interpolation signal of pitch correspondence interpolation signal generating processes (first and second examples), which are applicable to the noise reducing apparatuses of the third and fourth examples.

FIG. 22 is a diagram schematically illustrating the flow of pitch calculation by the pitch calculator 51 and generation of the source interpolation signal (generation source signal) by the source interpolation signal generator 35B in the noise reducing apparatuses shown in FIG. 20 to perform the pitch correspondence interpolation signal generating processes of the first example.

The signal (for example, the noise time signal tmg_ng) indicating the noise occurrence period is input as the noise recognition information output from the noise time generation processor 38 to the pitch calculator 51 shown in FIG. 20 to recognize start time ts of the noise occurrence period Tn.

Subsequently, the pitch calculator 51 sets a predetermined period, which is before the recognized start time ts and near the noise occurrence period Tn, as a pitch calculation period Tp in a time series of the input voice signal. FIG. 22 shows an example where the pitch calculation period Tp is set immediately before start time ts.

The pitch calculator 51 calculates the pitch of the input voice signal in accordance with a method such as the above-described AMDF by using the input voice signal of the pitch calculation period Tp set in the above-described way.

Here, the pitch calculation period Tp is a voice signal interval before the noise occurrence period Tn. That is, the input voice signal is a signal where no noise occurs at any band. In this embodiment, the pitch is calculated using the voice signal of an interval where no noise occurs. In this way, the pitch is exactly calculated.

Subsequently, in order to generate the source interpolation signal, the source interpolation signal generator 35B inputs the signal (for example, the noise time signal tmg_ng) representing the noise occurrence period as the noise recognition information output from the noise time generation processor 38 to recognize the time length, that is, start time ts of the noise occurrence period Tn.

Subsequently, the source interpolation signal generator 35B sets a pre-noise source signal interval Ts1 with a time length expressed by a relation of the noise occurrence period Tn=1.5*Ts1. The pre-noise source signal interval Ts1 is set immediately before start time ts in the input voice signal, as shown in FIG. 22.

Figure 23A:
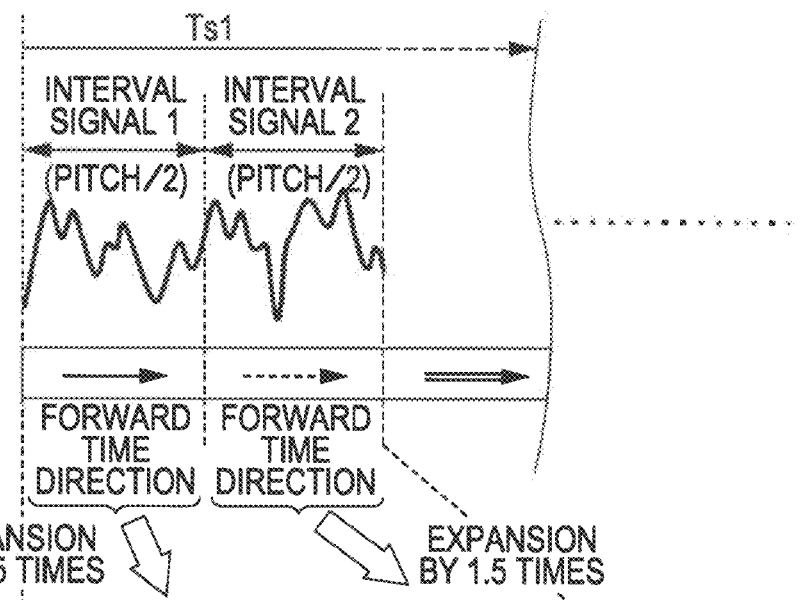
FIGS. 23A and 23B are diagrams schematically illustrating the pitch correspondence interpolation signal generating process of the first example.
Figure 23B:
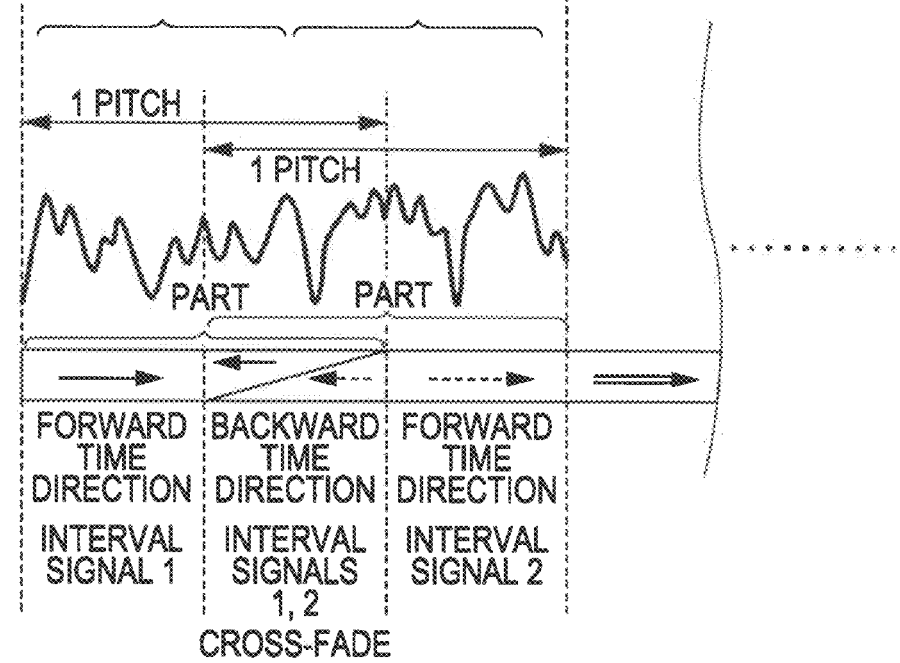

The source interpolation signal generator 35B generates the source interpolation signal in the way shown in FIGS. 23A and 23B by using the input voice signal during the pre-noise source signal interval Ts1.

FIG. 23A shows all portions of the input voice signal of the pre-noise source signal interval Ts1.

As shown in FIG. 23A, the source interpolation signal generator 35B divides the input voice signal of the pre-noise source signal interval Ts1 into units (unit period interval) of the half (pitch/2) of the period time pitch as the pitch calculated by the pitch calculator 51 in accordance with a time series. The signal units divided in this way are referred to as interval signals 1, 2 . . . in temporal order.

Subsequently, the source interpolation signal generator 35B generates the source interpolation signal by using interval signals 1, 2 . . . with the pitch/2 period, as shown in a transition state in FIGS. 23A and 23B.

That is, interval signal 1 in a forward time direction is first copied as the interpolation signal in a first pitch/2 period interval. Interval signal 1 of the input voice signal shown in FIG. 23A is processed to be read in a LIFO (Last In First Out) method without change. That is, the interval signals are written to the memory in the time series, and then are read in the same order as that at the writing time.

Interval signals 1 and 2 converted in a backward direction of the time-series source signal are used in a second pitch/2 period interval. As for the interval signals in the backward direction, the interval signals of the input voice signal shown in FIG. 23A are output in a FILO (First In Last Out) method. That is, the interval signals are written to the memory in the time series, and then are read in the reverse order to that in the writing time.

Subsequently, as for interval signals 1 and 2 in the backward time direction, for example, interval signal 1 is decreased by a ratio from 100% to 0% and interval signal 2 is increased by a ratio from 0% to 100% to perform the cross-fade (overlapping) process and perform a combining process. The voice signal obtained in this way is connected as the voice signal corresponding to the second pitch/2 period interval.

Interval signal 2 in the forward time direction is connected in a third pitch/2 period interval.

In this way, in the pitch correspondence interpolation signal generating process of the first example, the source interpolation signal corresponding to three continuous pitch/2 period intervals are generated using the interval signals corresponding to two continuous pitch/2 period intervals. Subsequently, the source interpolation signal corresponding to the next three (fourth to sixth) continuous pitch/2 period intervals are generated using interval signals 3 and 4 as the next two continuous signals in the input voice signals, for example, by the same process of interval signals 1 and 2. Subsequently, the same process is performed until the end of the pre-noise source signal interval Ts1.

In this case, the time length of the source interpolation signal formed using all of the interval signals that form the pre-noise source signal interval Ts1 is expressed as 1.5*Ts1, as shown in FIG. 22. That is, the source interpolation signal can be considered to be expanded in the time axis direction by 1.5 multiple of the pre-noise source signal interval Ts1.

The interpolation signal generated by arranging the interval signals with the period interval set on the basis of the pitch calculated from the input voice signal has the frequency characteristic corresponding to the pitch of the input voice signal. That is, the continuity of the frequency characteristic can be obtained by the input voice signal and the interpolation signal.

Here, in FIG. 23B, the amplitudes of the same interval signal 1 correspond to each other by connecting the interval signal 1 at the end position of the first pitch/2 period interval to the interval signal 1 at the start position of the second pitch/2 period interval in order of the forward time direction and the backward time direction. That is, the amplitude waveforms are connected to each other in the boundary between the first and second pitch/2 period intervals.

Likewise, the amplitude waveforms are connected to each other in the boundary between the second and third pitch/2 period intervals by connecting the same interval signal 2 at the end position of the second pitch/2 period interval and the start position of the third pitch/2 period interval in order of the backward time direction and the forward time direction. That is, the source interpolation signal is necessarily connected at the boundaries of the pitch/2 period intervals.

For example, an interpolation signal generation method disclosed in Japanese Unexamined Patent Application Publication No. 2008-52772, Japanese Unexamined Patent Application Publication No. 2008-71374, and Japanese Unexamined Patent Application Publication No. 2008-77707 mentioned above is performed as follows.

That is, a weighted addition signal corresponding to one pitch period is generated by performing a cross-fade process on two signal intervals, which correspond to one pitch period, before and after the start point of a noise occurrence period. Subsequently, a first-half signal corresponding to the noise occurrence period is generated by repeatedly connecting one same weighted addition signal. Likewise, a second-half signal is generated. That is, a weighted addition signal corresponding to one pitch period is generated by performing the cross-fade process on two signal intervals, which correspond to one pitch period, before and after the end point of the noise occurrence period. Subsequently, the second-half signal corresponding to the noise occurrence period is generated by repeatedly connecting one same weighted addition signal.

Subsequently, an interpolation signal corresponding to the noise occurrence period is generated by performing the cross-fade process on the first-half and second half signals generated in this way.

In Japanese Unexamined Patent Application Publication No. 2008-52772, Japanese Unexamined Patent Application Publication No. 2008-71374, and Japanese Unexamined Patent Application Publication No. 2008-77707, the interpolation signal is formed by repeatedly connecting the weighted addition signals corresponding to one pitch period to each other simply. When the same signals are simply repeated, a noise called a bit sound newly occurs in the repeated period. This bit sound easily occurs with an increase in the number of repetitions, when the noise occurrence period becomes longer or the pitch period becomes shorter, for example.

In Japanese Unexamined Patent Application Publication No. 2008-52772, Japanese Unexamined Patent Application Publication No. 2008-71374, and Japanese Unexamined Patent Application Publication No. 2008-77707, the interpolation signal is formed by the cross-fade process on two voice signals, and the interpolation signal obtained finally is also formed by the cross-fade process on the first-half and second-half signals. The continuity between the previous and next voice signals is easily maintained by the cross-fade process, compared to a case where a single voice signal is used, for example.

However, the result may be mutually mismatched depending on a condition of a phase difference between the two voice signals subjected to the cross-fade process. For this reason, the deterioration in the signal level may not be avoided. When the deterioration in the signal level occurs, this state repeats or continues during the noise removing process. Therefore, a sufficient interpolation effect may not be obtained.

In Japanese Unexamined Patent Application Publication No. 2008-52772, Japanese Unexamined Patent Application Publication No. 2008-71374, and Japanese Unexamined Patent Application Publication No. 2008-77707, the interpolation signal is generated on the basis of the input voice signal. Therefore, the continuity between the voice signal and the interpolation signal before and after the noise occurrence period is easily achieved. However, since the voice signal of the whole or the end of the noise occurrence period is used in the half of the weighted addition signal, the interpolation signal mixed with a noise may be formed, and thus a natural voice in terms of acoustic sense may deteriorate.

In this embodiment described with reference to FIG. 22 and FIGS. 23A and 23B, however, the envelopes (amplitude waveform) of the interval signals in the source interpolation signal are connected at the connection position in the pitch correspondence interpolation signal generating process, as described above. Accordingly, in this embodiment, the bit sound or the like causing the repetition of the interval signal is effectively inhibited. When the interval signals in the same forward time direction are simply connected, the envelopes are sharply changed at the connection point and thus the interval signals have a harmonics component. For this reason, the bit sound may easily occur.

In the source interpolation signal according to this embodiment, the amplitude waveform is connected at the connection position of the same interval signal in which the time direction is reversed. However, a dot connection is normally made and thus a smooth tangent line is rarely connected. Therefore, a harmonics component occurs at the connection position of each interval signal in which the time direction is reversed. However, the harmonics component is smaller, compared to a case where the amplitude waveform is not continuous in the simple connection of the interval signals. Accordingly, the bit sound is correspondingly inhibited.

Moreover, the source interpolation signal generated by the source interpolation signal generator 35B is restricted only to the frequency, where a noise occurs, by the interpolation filter 36. At this time, since the harmonics component occurring at the dot connection is nearly completely removed, no problem occurs.

In the source interpolation signal according to this embodiment, the cross-fade interval is present for the pitch/2 period. However, according to FIG. 23B, the cross-fade interval appears just once whenever the pitch/2 period is continuous three times. That is, the cross-fade interval is ⅓ with respect to the entire source interpolation signal. Accordingly, compared to a case where the cross-fade process is performed on the entire intervals of the source interpolation signal, there is a low possibility that the level deteriorates due to the phase condition in the cross-fade interval. Moreover, even when the level deteriorates, the deterioration is solved in a short time. Accordingly, it is difficult to notice this deterioration.

In this embodiment, since the source interpolation signal is generated using the input voice signal of the interval where no noise occurs, the noise is mixed in the source interpolation signal. Moreover, it is possible to improve the continuity between the interpolation signal and the input voice signal before and after the interpolation signal.

In this embodiment, as described above, only the frequency band, where the noise occurs, is removed by the noise removing filter 33 and the frequency band, where no noise occurs, remains without changing the input voice signal. Accordingly, by improving the continuity between the interpolation signal and the input voice signal before and after the interpolation signal, a natural voice in terms of acoustic sense is obtained. Moreover, the natural voice in terms of acoustic sense is also obtained in the noise reducing apparatus performing the pitch correspondence interpolation signal generating process.

In FIG. 22, when the source interpolation signal is generated, the input voice signal before the noise occurrence period Tn is used as the input voice signal of the interval where no noise occurs. However, in the pitch correspondence interpolation signal generating process of the above-described first example and the pitch correspondence interpolation signal generating process of the following second example, the source interpolation signal may be generated using the input voice signal after the noise occurrence period Tn.

In the pitch correspondence interpolation signal generating process of the first example, as shown in FIGS. 23A and 23B, a unit interpolation signal part is formed by connecting the interval signal in the forward time direction and the interval signal in the backward time direction to each other each in one interval signal. Then, the unit interpolation signal parts are arranged on the time axis in the temporal order of the interval signals of a generation source.

Subsequently, in this case, the pitch/2 period of the final interval signal in the front unit interpolation signal part and the pitch/2 period of the first interval signal in the rear unit interpolation signal part overlap with each other. Subsequently, the overlapping pitch/2 period, the combination is performed in the cross-fade process.

In the first example, when the even number of interval signals in the same sequence (unit period interval) is used to form the unit interpolation signal part, two interval signals are used.

6-3. Interpolation Signal Generating Process Based on Pitch (Second Example)

Next, the second example of the pitch correspondence interpolation signal generating process according to this embodiment will be described with reference to FIGS. 24A and 24B.

FIGS. 24A and 24B are diagrams illustrating an example in which the unit interpolation signal part is formed by the odd number of interval signals in the same time (unit period interval), for example, the minimum three interval signals.

In the noise reducing apparatus, the pitch calculation by the pitch calculator 51 and the source interpolation signal (generation source signal) by the source interpolation signal generator 35B are performed likewise in the pitch correspondence interpolation signal generating process of the first example in FIG. 22.

In FIG. 24A, all portions of the input voice signal in the pre-noise source signal interval Ts1 are shown as in FIG. 23A. That is, in the source interpolation signal generator 35B of the second example, the input voice signal of the pre-noise source signal interval Ts1 is also divided into interval signals 1, 2 . . . with the pitch/2 period, as in the first example.

Subsequently, the source interpolation signal generator 35B arranges interval signal 1 in the forward time direction in a first pitch/2 period interval of the source interpolation signal, as shown in FIG. 24B. Subsequently, the source interpolation signal generator 35B arranges interval signal 1 in the backward time direction in a second pitch/2 period interval, and then arranges interval signal 3 in the forward time direction in a third pitch/2 period interval.

Subsequently, the source interpolation signal generator 35B arranges interval signal 2 in the forward time direction in a fourth pitch/2 period interval of the source interpolation signal. Subsequently, the source interpolation signal generator 35B arranges interval signal 2 in the backward time direction in a fifth pitch/2 period interval, and then arranges interval signal 2 in the forward time direction in a sixth pitch/2 period interval.

That is, in the pitch correspondence interpolation signal generating process of the second example, one interval signal is arranged in order of the forward time direction, the backward time direction, and the forward time direction. This interval signal is repeated in a time series.

Even in the source interpolation signal formed in this way, the envelopes of the amplitude waveform at the connection position of the interval signals are maintained with the dot connection.

In the second example, when the unit interpolation signal part is formed by the odd number of interval signals, the final interval signal of the front unit interpolation signal part and the initial interval signal of the rear unit interpolation signal part are arranged together in the forward time direction. That is, two interval signals continuous over time are connected to each other without change for a period during which the final interval signal of the front unit interpolation signal part and the initial interval signal of the rear unit interpolation signal part are arranged. Accordingly, the dot connection of amplitude waveforms is formed in the boundary of these interval signals, thereby obtaining the more satisfactory tangent line connection. That is, when the unit interpolation signal part is formed by the odd number of interval signals, the unit interpolation signal parts may simply be connected to each other in temporal order of the interval signals of a generation source.

Moreover, the interval where the interval signal is subjected to the cross-fade process in the source interpolation signal may not be formed. Therefore, there is no problem that the level is reduced due to the phase condition of two signals subjected to the cross-fade process.

In this case, the source interpolation signal has a time length expanded by 3 multiples of the pre-noise source signal interval Ts1. That is, a relation of Tn=3*Ts1 is satisfied as the relation with the noise occurrence period Tn corresponding to the source interpolation signal. This means that the pre-noise source signal interval Ts1 has ⅓ of the time length of the noise occurrence period Tn. For example, in comparison with the first example, the pre-noise source signal interval Ts1 necessary to correspond to the same noise occurrence period Tn can be shortened up to ½.

In the second example, the time for the input voice signal necessary for generating the source interpolation signal is shortened, and thus the processing amount becomes smaller. In this embodiment, the removing target noise is a noise which irregularly occurs intermittently over time. When a plurality of the noises occurs in a short time, a period during which the noise occurs may be shortened between the present noise occurrence period and the noise occurrence period before one noise occurrence period. However, even in this case, there is a high possibility of obtaining the pre-noise source signal where no noise occurs.

6-4. Interpolation Signal Generating Process Based on Pitch (Third Example)

A third example of the pitch correspondence interpolation signal generating process according to this embodiment will be described with reference to FIG. 25 and FIGS. 26A to 26C.

FIG. 25 is a diagram schematically illustrating pitch calculation by the pitch calculator 51 and generation of the source interpolation signal (generation source signal) by the source interpolation signal generator 35B in the noise reducing apparatuses in the third example.

In this case, the signal (for example, the noise time signal tmg_ng) indicating the noise occurrence period is also input as the noise recognition information output from the noise time generation processor 38 to the pitch calculator 51. The pitch calculator 51 recognizes start time ts and end time te of the noise occurrence period Tn on the basis of this signal. Moreover, the pitch calculator 51 also recognizes peak time tp on the basis of a signal which is output as the noise recognition information output from the noise time generation processor 38 and indicates the voice sound (noise sound) in the noise occurrence period Tn.

Subsequently, as in the first example, the pitch calculator 51 sets a certain period immediately before start time ts, for example, in a time series of the input voice signal as a pitch calculation period Tp1, and then calculates the pitch by using the input voice signal of the pitch calculation period Tp1. The pitch calculated so as to correspond to the pitch calculation period Tp1 is referred to as pre-pitch.

In addition, the pitch calculator 51 sets a predetermined period, which is after end time te and near the noise occurrence period Tn, as a pitch calculation period Tp2 in a time series of the input voice signal. In FIGS. 24A to 24C, the pitch calculation period Tp2 immediately after end time te is set. The pitch calculator 51 calculates a post-pitch by using the input voice signal of the pitch calculation period Tp2.

Subsequently, in order to generate the source interpolation signal, the source interpolation signal generator 35B inputs the noise recognition information output from the noise time generation processor 38 to recognize start time ts, end time te, and peak time tp of the noise occurrence period Tn.

In this case, the source interpolation signal generator 35B connects the front interpolation signal (front generation source signal) to the rear interpolation signal (rear generation source signal) continuous after the front interpolation signal to generate the source interpolation signal corresponding to the noise occurrence period Tn.

Then, the source interpolation signal generator 35B recognizes the time length as a front interpolation signal period Tn−1 from the recognized start time ts to peak time tp, and calculates a time length, which is set as the pre-noise signal interval Ts1 immediately before the noise occurrence period, on the basis of the time length of the front interpolation signal period Tn−1.

Likewise, the source interpolation signal generator 35B recognizes the time length as a rear interpolation signal period Tn−2 from the recognized peak time tp to end time te, and calculates a time length, which is set as the rear interpolation signal period Ts2 immediately after the noise occurrence period, on the basis of the time length of the rear interpolation signal period Tn−2.

A method of calculating the time length of the pre-noise signal interval Ts1 and the time length of the rear interpolation signal period Tn−1 is described below with reference to FIGS. 26A to 26C.

Next, the pitch correspondence interpolation signal generating process performed by the source interpolation signal generator 35B will be described in the third example.

In the third example, as in the above-described example, the source interpolation signal generator 35B divides each input voice signal of the pre-noise source signal interval Ts1 and the post-noise source signal interval Ts2 in an interval signal unit of the pitch/2 period.

In FIG. 26A, two interval signals N−1 and N in the end of the pre-noise source signal are shown as the input voice signal of the pre-noise source signal interval Ts1. In FIG. 26B, two interval signals N+1 and N+2 in the end of the pre-noise source signal are shown as the input voice signal of the post-noise source signal interval Ts2.

As the pitch correspondence interpolation signal generating process of generating the front interpolation signal and the rear interpolation signal, the process (the unit interpolation signal part is formed by even-numbered interval signals) corresponding to that in the first example may be used or the process (the unit interpolation signal part is formed by odd-numbered interval signals) corresponding to that in the second example may be used. In FIGS. 26A to 26C, the unit interpolation signal part is formed by odd-numbered interval signals, for example, three interval signals, as in the second example.

The front interpolation signal is generated by the same process as that shown in FIGS. 24A and 24B in the second example. In FIG. 26C, the source interpolation signal is shown in the boundary between the end portion of the front interpolation signal and the start portion of the rear interpolation signal.

In FIG. 26C, one unit interpolation signal part is formed by arranging interval signal N−1 of the end portion of the front interpolation signal immediately before the final interval signal in the pre-noise signal interval Ts1 in order of the forward time direction, the backward time direction, and the forward time direction.

The next pitch/2 interval is an interval corresponding to the boundary between the front interpolation signal and the rear interpolation signal. A pitch/2 interval subsequent to this interval is an interval of the rear interpolation signal. As illustrated, a second interval signal N+2 of the post-noise source signal interval Ts2 is arranged in the pitch/2 interval in order of the forward time direction, the backward time direction, and the forward time direction. Subsequently, each interval signal subsequent to a third interval signal is arranged in the pitch/2 interval in order of the forward time direction, the backward time direction, and the forward time direction. When this arrangement is carried up to the final interval signal of the post-noise source signal interval Ts2, the rear interpolation signal is formed in the end portion.

Subsequently, a connection portion comb corresponding to an interval of one pitch/2 period is located between the final unit interpolation signal part of the front interpolation signal and the initial unit interpolation signal part of the rear interpolation signal, as shown in FIG. 26C.

A voice signal formed by performing the cross-fade process on the final interval signal N of the pre-noise source signal interval Ts1 and the initial interval signal N+1 of the post-noise source signal interval Ts2 is arranged in the connection portion comb. In the cross-fade process, the interval signal N increases in the range from 0% to 100% and the interval signal N+1 decreased in the range from 100% to 0%. Accordingly, in the boundary between the pitch/2 interval subjected to the cross-fade process and the pitch/2 interval immediately before the pitch/2 interval subjected to the cross-fade process, dot connection is obtained between the end position of the interval signal N−1 in the forward time direction and the start position of the interval signal N in the forward time direction. In addition, in the boundary between the pitch/2 interval subjected to the cross-fade process and the pitch/2 interval immediately after the pitch/2 interval subjected to the cross-fade process, dot connection is obtained between the end position of the interval signal N+1 in the forward time direction and the start position of the interval signal N+2 in the forward time direction.

A method of generating the simplest source interpolation signal by using the front interpolation signal and the rear interpolation signal is a method of simply connecting the front interpolation signal formed by the connection of the unit interpolation signal parts to the rear interpolation signal formed by the connection of the unit interpolation signal parts. That is, the connection is made by removing the connection portion comb shown in FIG. 26C. In such a source interpolation signal, however, the dot connection may not be obtained at the end position of the front interpolation signal and the start position of the rear interpolation signal. For this reason, the connection portion comb is provided in the example of FIGS. 26A to 26C.

In the process of generating the front interpolation signal and the start position of the rear interpolation signal, the input voice signal of the post-noise source signal interval is expanded by three times, as in the pitch correspondence interpolation signal generating process of the second example. Accordingly, the pre-noise source signal interval Ts1 is set to have a time length of ⅓ of the front interpolation signal interval Tn−1. Likewise, the post-noise source signal interval Ts2 is also set to have a time length of ⅓ of the rear interpolation signal interval Tn−2.

When the source interpolation signal is generated by connecting the front interpolation signal to the rear interpolation signal, the continuity between the interpolation signal and the input voice signal before and after the interpolation signal can be further improved, as in the above-described second example of the noise reducing apparatus. There is a possibility that the pitch of the input voice signal is varied before and after the noise occurrence period Tn. However, particularly in the pitch correspondence interpolation signal generating process of the third example, it is possible to deal with the variation in the pitch period before and after the noise occurrence period. Accordingly, a more natural voice in terms of acoustic sense is expected.

In the third example, there is an advantage of shortening the pre-noise source signal interval Ts1 and the post-noise source signal interval Ts2 for the noise occurrence period Tn with the same time duration more than the pre-noise source signal interval Ts1 of the second example in FIG. 22.

7. Exemplary Configuration of Noise Reducing Apparatus (Fourth Example)

Figure 21:
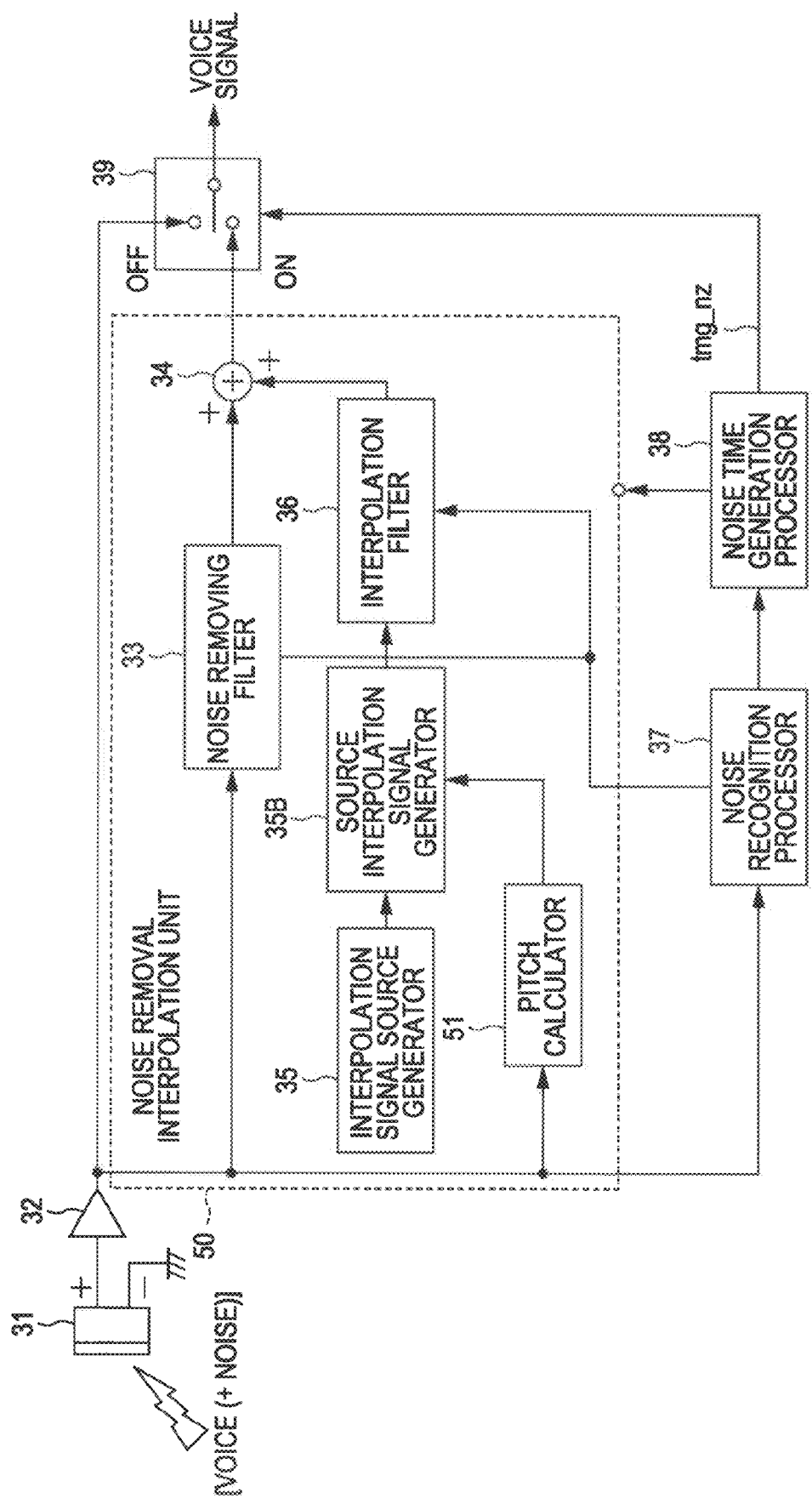
FIG. 21 is a block diagram illustrating an exemplary configuration of the noise reducing apparatus (fourth example) according to the embodiment.

FIG. 21 is a block diagram illustrating an exemplary configuration of the noise reducing apparatus (fourth example) according to the embodiment.

In FIG. 21, the same reference numerals are given to the same elements as those in the first example in FIG. 14, and the description is omitted. The configuration in FIG. 21 is common to the configuration in the first example in FIG. 14, in that the interpolation signal is generated not on the basis of the input voice signal but on the basis of the interpolation signal source (use voice signal) generated in the interpolation signal source generator 35.

In FIG. 21, the pitch calculator 51 and an interpolation signal generator 35C are disposed in addition to the configuration in FIG. 14.

In FIG. 21, the noise removal interpolation unit 50 includes the noise removing filter 33, the adder 34, the interpolation signal source generator 35, the source interpolation signal generator 35C, the interpolation filter 36, and the pitch calculator 51, as in FIG. 20. The noise recognition information is output from the noise time generation processor 38 to the noise removal interpolation unit 50.

The pitch calculator 51 has the same configuration as that of the noise reducing apparatus of the third example shown in FIG. 20. The pitch calculator 51 calculates the pitch of the input voice signal from the amplifier 32 and outputs information indicating the calculated pitch to the source interpolation signal generator 35C.

The source interpolation signal generator 35C inputs the interpolation signal source as the generation source signal of the interpolation signal and generates the source interpolation signal in the following way on the basis of the pitch of the calculated input voice signal.

In the noise reducing apparatus of the fourth example, a process similar to any one of the processes of the first, second, and third examples can be performed as the pitch correspondence interpolation signal generating process.

The pitch calculator 51 is configured to perform the same process as that in FIG. 22, when processes similar to the pitch correspondence interpolation signal generating processes in the first and second examples are performed. That is, the pitch is calculated using either one of the input voice signals before and after the noise occurrence period Tn except for the noise occurrence period Tn. The pitch calculator 51 is configured to perform the same process as that in FIG. 25, when a process similar to the pitch correspondence interpolation signal generating process in the third example is performed.

First, the pitch correspondence interpolation signal generating process similar to that in the first example will be described.

In this case, the source interpolation signal generator 35C acquires the voice signal with a time duration of ⅔ multiple of the noise occurrence period Tn from the voice signal of the interpolation signal source. This corresponds to the process of setting the pre-noise source signal interval Ts1 in FIG. 22 and extracting the voice signal in the pre-noise source signal interval Ts1. However, the interpolation signal source is a voice signal which is continuously generated and is not mixed with a noise like the input voice signal. Accordingly, time, at which the voice signal with the time duration of ⅔ multiple of the noise occurrence period Tn is extracted from the interpolation signal source, is arbitrarily determined.

The source interpolation signal generator 35C generates the interpolation signal source into the interval signals with the pitch/2 period, generates the source interpolation signal with the time duration of only the noise occurrence period Tn by the same process as that described in FIGS. 23A and 23B, and then outputs the source interpolation signal to the interpolation filter 36.

When the pitch correspondence interpolation signal generating process similar to that in the second example is performed, the source interpolation signal generator 35C extracts the voice signal with the time duration of ⅓ of the noise occurrence period Tn from the voice signal as the interpolation signal source at an arbitrary time.

Subsequently, the source interpolation signal generator 35C divides the interpolation signal source into the interval signals with the pitch/2 period, and generates the source interpolation signal with the time duration of only the noise occurrence period Tn by the same process as that in FIG. 24, and then outputs the source interpolation signal to the interpolation filter 36.

When the pitch correspondence interpolation signal generating process similar to that in the third example is performed, the source interpolation signal generator 35C extracts the voice signal with the time duration (which is the same time duration as that of the pre-noise source signal interval Ts1 in FIG. 25) of ⅓ of the front interpolation signal period Tn−1 from the voice signal as the interpolation signal source at an arbitrary time, and then sets the voice signal to the pre-noise source signal. Likewise, the source interpolation signal generator 35C extracts the voice signal with the time duration (which is the same time duration as that of the post-noise source signal interval Ts2 in FIG. 25) of ⅓ of the rear interpolation signal period Tn−2 from the voice signal as the interpolation signal source at an arbitrary time, and then sets the voice signal to the pre-noise source signal.

Subsequently, the source interpolation signal generator 35C divides the pre-noise source signal and the post-noise source signal into the interval signals with the pitch/2 period, and generates the source interpolation signal in the same process as that in FIGS. 26A to 26C.

In the noise reducing apparatus of the fourth example, the source interpolation signal generated by the pitch correspondence interpolation signal generating process is not set as the input voice signal, but is set as the interpolation signal source, that is, a voice signal formed by combining the tone signal and the M series signal, for example.

However, even when the interpolation is performed with a signal different from the input voice signal, a more natural voice in terms of acoustic sense is obtained by generating the source interpolation signal by the above process, compared to the case of simply connecting the interpolation signal source in the forward time direction and generating the source interpolation signal, for example. This fact is confirmed by an experiment carried out by the inventors.

The noise reducing apparatus (FIGS. 20 and 21) of the third and fourth examples performing the above-described pitch correspondence interpolation signal generating process (the first to third examples) includes the noise removing filter 33 and the interpolation filter 36. Therefore, only the division frequency where a noise occurs is removed from the input voice signal for the noise occurrence period, the division frequency, where no noise occurs, remains to generate a noise removing signal, and then the noise removing signal is stored by the interpolation signal of the band characteristic formed by only the removed division frequency. Accordingly, as described above, the component of the input voice signal for the noise occurrence period remains as much as possible. Therefore, the continuity between the input voice signals for the periods before and after the noise occurrence period is improved.

In the pitch correspondence interpolation signal generating process (the first to third examples), however, the entire bands of the input voice signal may be removed for the noise occurrence period, and the interpolation signal with the same band characteristic as that of the entire bands may be interpolated instead.

Even when the noise removal interpolation method is used, the interpolation signal is generated by the pitch correspondence interpolation signal generating process (the first to third examples) shown in FIGS. 23A and 23B, FIG. 24, and FIGS. 26A to 26C. With such a configuration, the dot connection between the waveforms of each pitch/2 period interval is made. Therefore, the advantages of preventing the deterioration in the level due to the phase condition can be effectively obtained by inhibiting the occurrence of harmonics and shortening or removing the cross-fade period.

In the configuration of the noise reducing apparatus in each example according to the embodiment, the configuration in which the amplifier 32 is disposed in the rear stage of the microphone 31 may be realized by hardware. Alternatively, this configuration may be realized by a DSP (Digital Signal Processor) or the like. That is, this configuration may be realized by a program (instruction) which is executed in hardware as the DSP. Alternatively, this configuration may be realized as a program executed by a CPU (Central Processing Unit). Alternatively, at least two of the hardware, the DSP, and the program of the CPU may be combined selectively.

The program may be stored in an auxiliary storage unit configured by a ROM, an HDD, or a flash memory of the noise reducing apparatus, for example, or may be stored in a removable storage medium, for example. Alternatively, a program stored in a server on a network may be downloaded via the network, for example, so that a user can acquire the program.

Examples of the noise reducing apparatus in each example according to the embodiment include a video camera, a digital still camera with a recording function, a cellular phone, an IC recorder, a record reproducing apparatus including a microphone and recording a received voice in a storage medium. In such an apparatus, it is necessary to remove a noise in nearly real time from the voice received by the microphone and record the voice. However, the configuration of the noise reducing apparatus according to this embodiment is effective when the noise is determined and removed in real time.

However, a voice source containing a noise input by the noise reducing apparatus according to this embodiment includes the voice received by the microphone and a voice signal obtained by reading a voice recorded in the record medium, for example. However, there is no problem. That is, the method of inputting the voice signal to obtain the input voice signal is not limited to the voice input system including the microphone.

The present application contains subject matter related to that disclosed in Japanese Priority Patent Application JP 2009-097190 filed in the Japan Patent Office on Apr. 13, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A noise reducing apparatus comprising:
voice signal inputting means for inputting a voice signal to acquire an input voice signal;
noise occurrence period detecting means for detecting a noise occurrence period of the input voice signal;
noise removing means for removing a noise occurring for the noise occurrence period from the input voice signal;
generation source signal acquiring means for acquiring a generation source signal with a time duration determined to correspond to a time duration corresponding to the noise occurrence period from a use voice signal being used to generate an interpolation signal;
pitch calculating means for calculating a pitch of an input voice signal interval near the noise occurrence period in the input voice signal input by the voice signal inputting means;
interval signal setting means for setting interval signals divided in each unit period interval set on the basis of the pitch calculated by the pitch calculating means from the generation source signal;
interpolation signal generating means for generating an interpolation signal with the time duration corresponding to the noise occurrence period on the basis of arrangement of unit interpolation signal parts, which are formed by connecting the interval signals of the same unit period interval, on a time axis and for alternately arranging the interval signal in a forward time direction and the interval signal in a backward time direction at least in the unit interpolation signal part; and
combining means for combining and outputting the interpolation signal and the input voice signal, from which the noise is removed by the noise removing means.

2. The noise reducing apparatus according to claim 1,
wherein the generation source signal acquiring means
acquires the generation source signal formed by a front generation source signal and a rear generation source signal connected to the rear of the front generation source signal,
acquires the front generation source signal from the use voice signal for a period before the noise occurrence period except for the noise occurrence period, and
acquires the rear generation source signal from the use voice signal for a period after the noise occurrence period except for the noise occurrence period, and
wherein the interpolation signal generating means
generates a front interpolation signal with a time duration corresponding to a front period of the noise occurrence period on the basis of the interval signal set for the front generation source signal,
generates a rear interpolation signal with a time duration corresponding to a rear period of the noise occurrence period on the basis of the interval signal set for the rear generation source signal,
and
generates the interpolation signal by sequentially connecting the front interpolation signal and the rear interpolation signal to each other.

3. The noise reducing apparatus according to claim 2, further comprising:
peak detecting means for detecting a peak of the noise for the noise occurrence period,
wherein the interpolation signal generating means sets the front period of the noise occurrence period to a period from start time of the noise occurrence period to peak time of the noise detected by the peak detecting means, and sets the rear period of noise occurrence period to a period from the peak time of the noise detected by the peak detecting means to end time of the noise occurrence period.

4. The noise reducing apparatus according to claim 2 or 3,
wherein the interpolation signal generating means forms a connection portion between the final unit interpolation signal part of the front interpolation signal and the initial unit interpolation signal part of the rear interpolation signal, and
wherein in the connection portion, the interpolation signal generating means
acquires a first combination interval signal, of which an amplitude waveform is connected to that of the final interval signal of the final unit interpolation signal part, from the front generation source signal,
acquires a second combination interval signal, of which an amplitude waveform is connected to that of the initial interval signal of the initial unit interpolation signal part, from the rear generation source signal, and
combines the first and second interval signals so that the first combination interval signal gradually decreases and the second combination interval signal gradually increases.

5. The noise reducing apparatus according to claim 1, wherein the generation source signal acquiring means acquires the generation source signal from the use voice signal for a period before or after the noise occurrence period except for the noise occurrence period.

6. The noise reducing apparatus according to claim claim 1,
wherein when the interpolation signal part is formed by even-numbered interval signals, the unit interpolation signal parts are arranged in temporal order of the interval signals of a generation source, and wherein a period of the final interval signal of the unit interpolation signal part overlaps with a period of the initial interval signal of the next unit interpolation signal part, and in the overlapping period, combining is performed so that the interval signal corresponding to the final unit period interval gradually decreases and the interval signal corresponding to the initial unit period interval gradually increases for the overlapping period.

7. The noise reducing apparatus according to claim claim 1, wherein when the interpolation signal part is formed by odd-numbered interval signals, the interpolation signal is generated by connecting the unit interpolation signal parts in temporal order of the interval signals of the generation source.

8. The noise reducing apparatus according to claim 2, wherein the generation source signal acquiring means calculates a time duration of the generation source signal or time durations of the front and rear generation source signals on the basis of the number of interval signals used to form the unit interpolation signal and the time duration corresponding to the noise occurrence period.

9. The noise reducing apparatus according to claim claim 1, wherein the pitch calculating means calculates the pitch of the input voice signal interval for the period before or after the noise occurrence period except for the noise occurrence period.

10. The noise reducing apparatus according to claim claim 1, wherein the generation source signal acquiring means inputs the input voice signal as the use voice signal.

11. The noise reducing apparatus according to claim claim 1, further comprising:
  interpolation signal source generating means for generating an interpolation signal source serving as a voice signal which is not based on input of the input voice signal to output the interpolation signal source as the use voice signal.

12. The noise reducing apparatus according to claim claim 1, further comprising:
  noise occurrence frequency detecting means for detecting a frequency where the noise occurs in the input voice signal,
  wherein the noise removing means sets a pass band characteristic to block only the frequency where the noise occurs, and
  wherein the interpolation signal generating means sets a pass band characteristic to pass only the frequency where the noise occurs.

13. The noise reducing apparatus according to claim claim 1, further comprising:
  switch means for inputting the voice signal output from the combining means and the input voice signal, outputting the voice signal output from the combining means for the noise occurrence period, and outputting the input voice signal for a period other than the noise occurrence period.

14. The noise reducing apparatus according to claim 13, wherein the switch means performs a cross-fade process so that a level of the voice signal output from the combining means gradually increases and a level of the input voice signal gradually decreases for a start period of the noise occurrence period and so that the level of the voice signal output from the combining means gradually decreases and the level of the input voice signal gradually increases for an end period of the noise occurrence period.

15. A noise reducing method comprising the steps of:
inputting an input voice signal;
detecting a noise occurrence period of the input voice signal;
removing a noise occurring for the noise occurrence period from the input voice signal;
acquiring a generation source signal with a time duration determined to correspond to a time duration corresponding to the noise occurrence period from a use voice signal being used to generate an interpolation signal;
calculating a pitch of an input voice signal interval near the noise occurrence period in the input voice signal input in the inputting of the voice signal;
setting interval signals divided in each unit period interval set on the basis of the pitch calculated in the calculating of the pitch from the generation source signal;
generating an interpolation signal with the time duration corresponding to the noise occurrence period on the basis of arrangement of unit interpolation signal parts, which are formed by connecting the interval signals of the same unit period interval, on a time axis and alternately arranging the interval signal in a forward time direction and the interval signal in a backward time direction at least in the unit interpolation signal part; and
combining and outputting the interpolation signal and the input voice signal, from which the noise is removed in the removing of the noise.

16. A noise reducing apparatus comprising:
a voice signal inputting unit inputting a voice signal to acquire an input voice signal;
a noise occurrence period detecting unit detecting a noise occurrence period of the input voice signal;
a noise removing unit removing a noise occurring for the noise occurrence period from the input voice signal;
a generation source signal acquiring unit acquiring a generation source signal with a time duration determined to correspond to a time duration corresponding to the noise occurrence period from a use voice signal being used to generate an interpolation signal;
a pitch calculating unit calculating a pitch of an input voice signal interval near the noise occurrence period in the input voice signal input by the voice signal inputting unit;
an interval signal setting unit setting interval signals divided in each unit period interval set on the basis of the pitch calculated by the pitch calculating unit from the generation source signal;
an interpolation signal generating unit generating an interpolation signal with the time duration corresponding to the noise occurrence period on the basis of arrangement of unit interpolation signal parts, which are formed by connecting the interval signals of the same unit period interval, on a time axis and alternately arranging the interval signal in a forward time direction and the interval signal in a backward time direction at least in the unit interpolation signal part; and
a combining unit combining and outputting the interpolation signal and the input voice signal, from which the noise is removed by the noise removing unit.

* * * * *